US012652357B2

(12) United States Patent
Gayango Perez et al.

(10) Patent No.: US 12,652,357 B2
(45) **Date of Patent: \*Jun. 9, 2026**

(54) MULTI-FUNCTION DEVICE (MFD) SYSTEM CONFIGURED TO DETECT AN MFD ANOMALY

(71) Applicant: Xerox Corporation, Norwalk, CT (US)

(72) Inventors: Aurora Gayango Perez, London (GB);
Michael Blowers, Fairport, NY (US);
Ian Davis, Fleet (GB)

(73) Assignee: Xerox Corporation, Norwalk, CT (US)

( * ) Notice: Subject to any disclaimer, the term of this patent is extended or adjusted under 35 U.S.C. 154(b) by 87 days.

This patent is subject to a terminal disclaimer.

(21) Appl. No.: 18/434,153

(22) Filed: Feb. 6, 2024

(65) Prior Publication Data

US 2025/0254244 A1      Aug. 7, 2025

(51) Int. Cl.
*G06K 15/00* (2006.01)
*G06K 15/02* (2006.01)
*H04N 1/00* (2006.01)

(52) U.S. Cl.
CPC ..... *H04N 1/00029* (2013.01); *H04N 1/00039* (2013.01); *H04N 1/00045* (2013.01); *H04N 1/00076* (2013.01); *H04N 2201/0094* (2013.01)

(58) Field of Classification Search
CPC ........... H04N 1/00074; H04N 1/00039; H04N 1/00042; H04N 1/0005; H04N 1/00087; H04N 1/00408; H04N 2201/0094
USPC ....................................................... 358/1.14
See application file for complete search history.

(56) References Cited

U.S. PATENT DOCUMENTS

| | | | |
|---|---|---|---|
| 10,360,504 B2 | 7/2019 | Helfman et al. | |
| 11,240,385 B1 | 2/2022 | Robles Flores et al. | |
| 11,483,435 B2 | 10/2022 | Schweid et al. | |
| 2006/0227946 A1 | 10/2006 | Henderson | |
| 2007/0192085 A1* | 8/2007 | Roulland ............ | G06F 16/3329 |
| | | | 704/9 |
| 2013/0060524 A1 | 3/2013 | Liao | |
| 2019/0130413 A1 | 5/2019 | Nelson et al. | |
| 2019/0265971 A1 | 8/2019 | Behzadi et al. | |
| 2022/0244892 A1* | 8/2022 | Wushour ................ | G06F 9/455 |
| 2023/0185494 A1* | 6/2023 | Brock ..................... | G06F 3/121 |
| | | | 358/1.14 |

(Continued)

OTHER PUBLICATIONS

IP.com search history (Year: 2025).*

(Continued)

*Primary Examiner* — Moustapha Diaby
(74) *Attorney, Agent, or Firm* — Bond, Schoeneck & King, PLLC

(57)      ABSTRACT

A multi-function device (MFD) (100) configured to detect an MFD anomaly and provide support, comprising: one or more MFD sensors (390) configured to obtain MFD sensor data; a processor (320) configured to: (i) receive MFD monitoring data, the MFD monitoring data comprising one or more of the MFD sensor data and user input data received from a user of the MFD; (ii) detect, from the received MFD monitoring data, an anomaly in one or more of the one or more MFDs; (iii) identify, by a trained support model analyzing the detected anomaly, a solution to the detected anomaly; and a user interface (340) configured to provide the identified solution to the user.

19 Claims, 11 Drawing Sheets

(56) References Cited

U.S. PATENT DOCUMENTS

2025/0254245 A1* 8/2025 Gayango Perez . H04N 1/00408

OTHER PUBLICATIONS

Beneker et al., Using Clustering for Categorization of Support Tickets, Proceedings of the LWDA 2017 Workshops: KDML, FGWM, IR, and FGDB, Sep. 11, 2017, pp. 1-13.

Besta et al., Graph of Thoughts: Solving Elaborate Problems with Large Language Models, Proceedings of the AAAI Conference on Artificial Intelligence 2024, Feb. 6, 2024, pp. 1-63.

Fuchs et al., Improving Support Ticket Systems Using Machine Learning: A Literature Review, Proceedings of the 55th Hawaii International Conference on System Sciences, Jan. 4, 2022, pp. 1893-1902.

Jia et al., Feature dimensionality reduction: a review, Survey and State of the Art, vol. 8, Jan. 21, 2022, pp. 2663-2693.

Pan et al., Unifying Large Language Models and Knowledge Graphs: A Roadmap, IEEE Transactions on Knowledge and Data Engineering (TKDE), Jan. 25, 2024, pp. 1-28.

Venkatachalam et al., How do context-aware artificial intelligence algorithms used in fitness recommender systems? A literature review and research agenda, International Journal of Information Management Data Insights 2 (2022) 100139, Nov. 18, 2022, pp. 1-19.

Zangari et al., Ticket automation: An insight into current research with applications to multi-level classification scenarios, Expert Systems With Applications 225 (2023) 119984, Apr. 14, 2023, pp. 1-21.

Vallath, Sekhar, The What, Where, and Why of Contextual AI, Symbl.ai, Mar. 30, 2021, Retrieved from the Internet: <URL: https://symbl.ai/developers/blog/the-what-where-and-why-of-contextual-ai/>.

Barthélemy et al., Natural Language Processing for Public Services, European Commission, Mar. 2022, pp. 1-65, DOI: 10.2799/304724.

Caldarini, Daniele, Text Classification using Machine Learning, SMC Tech Blog, Dec. 21, 2020, Retrieved from the Internet <URL: https://techblog.smc.it/en/2020-12-21/nlp-text-clf>.

* cited by examiner

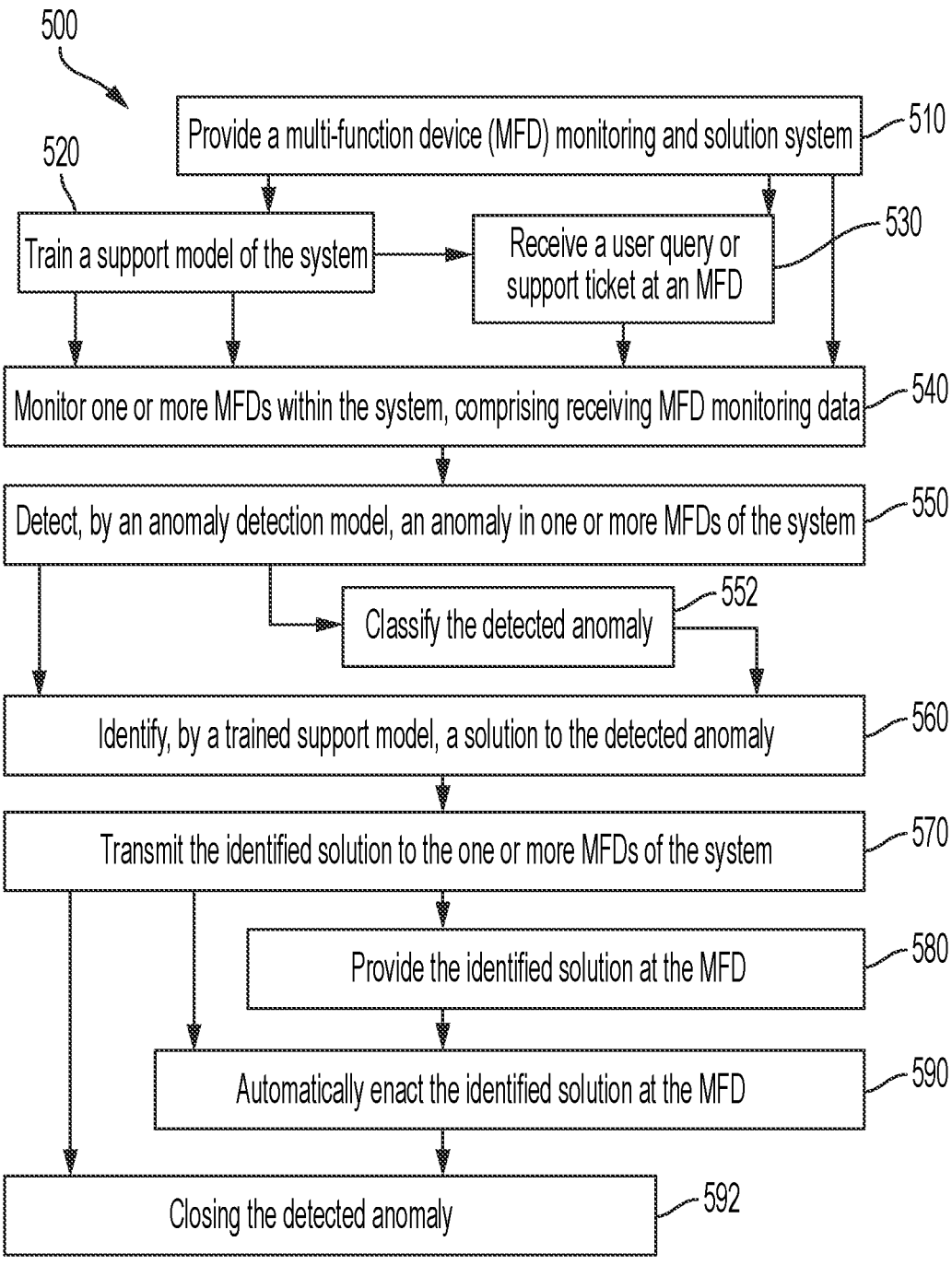

500

520

Provide a multi-function device (MFD) monitoring and solution system — 510

Train a support model of the system

Receive a user query or support ticket at an MFD — 530

Monitor one or more MFDs within the system, comprising receiving MFD monitoring data — 540

Detect, by an anomaly detection model, an anomaly in one or more MFDs of the system — 550

Classify the detected anomaly — 552

Identify, by a trained support model, a solution to the detected anomaly — 560

Transmit the identified solution to the one or more MFDs of the system — 570

Provide the identified solution at the MFD — 580

Automatically enact the identified solution at the MFD — 590

Closing the detected anomaly — 592

FIG. 5

Figure 8A:
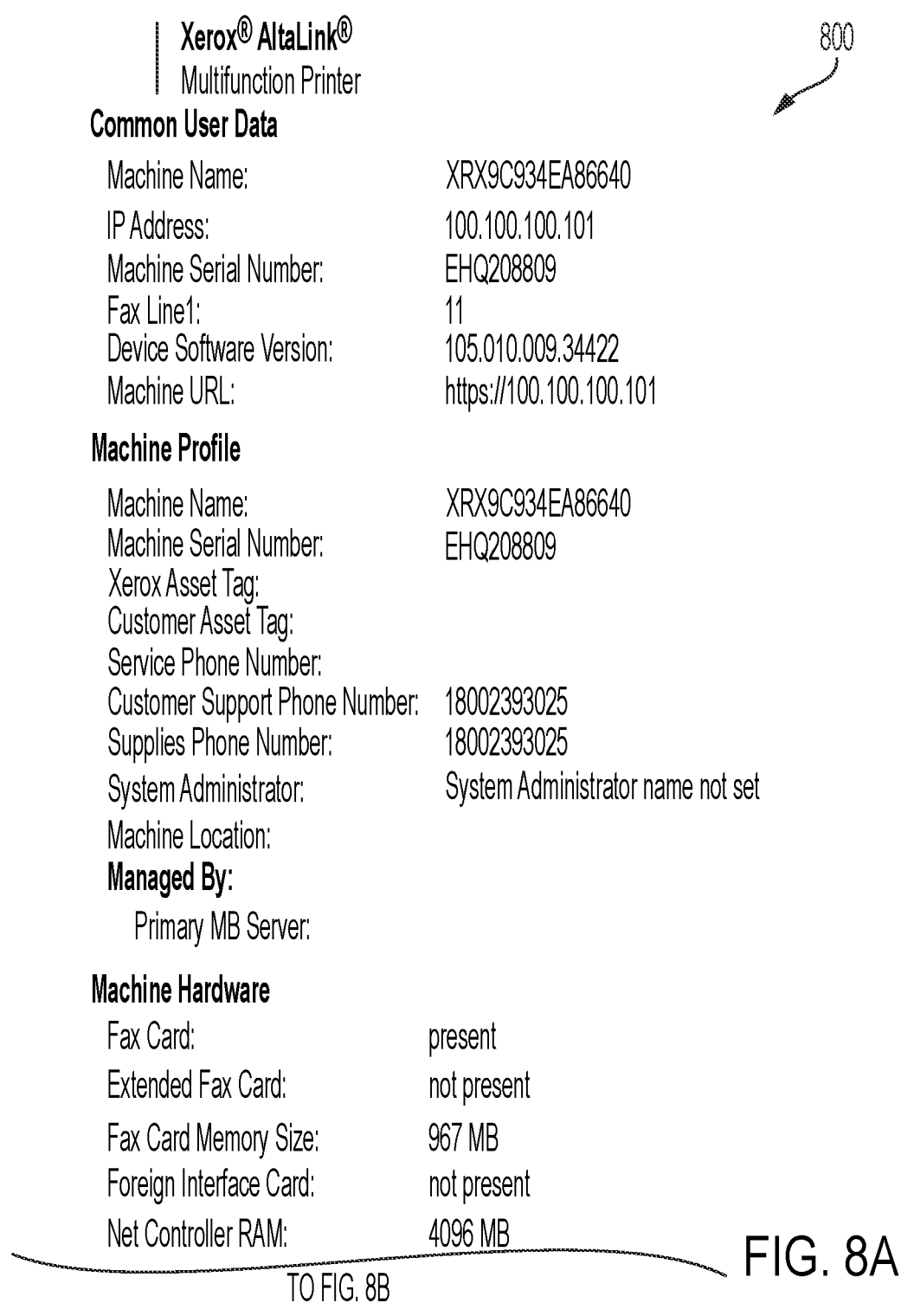

Xerox® AltaLink®
Multifunction Printer

800

Common User Data

Machine Name:                        XRX9C934EA86640
IP Address:                          100.100.100.101
Machine Serial Number:               EHQ208809
Fax Line1:                           11
Device Software Version:             105.010.009.34422
Machine URL:                         https://100.100.100.101

Machine Profile

Machine Name:                        XRX9C934EA86640
Machine Serial Number:               EHQ208809
Xerox Asset Tag:
Customer Asset Tag:
Service Phone Number:
Customer Support Phone Number:       18002393025
Supplies Phone Number:               18002393025
System Administrator:                System Administrator name not set
Machine Location:
Managed By:
   Primary MB Server:

Machine Hardware

Fax Card:                            present
Extended Fax Card:                   not present
Fax Card Memory Size:                967 MB
Foreign Interface Card:              not present
Net Controller RAM:                  4096 MB

FROM FIG. 8A

_800_

| | |
|---|---|
| Net Controller Drive Size: | used=4808MB/total=128035MB |
| EPC Memory Size: | 872 MB |
| Image Disk: | present |
| Finisher Type: | Office Finisher |
| Finisher Punch: | None |
| Finisher Folder: | not present |

General Setup

| | |
|---|---|
| Remote Services: | Enabled |
| Remote Software Download: | Enabled |
| Remote Services Trans. Time: | 01:30 |
| E-mail Alerts: | Disabled |
| Service Plan: | Neutral |
| Billing Impression Mode: | A4 Impressions |
| Startup Config Report: | Disabled |
| GMT Offset: | -06:00 |
| Energy Mode: | Productivity |
| Cloning Installation: | Allowed (Encrypted Files Only) |
| File Sharing | Enabled |
| IBIG2 | Lossless |

Energy Saver

| | |
|---|---|
| Deep Sleep: | Disabled |
| Energy Saver Mode: | Job Activated |
| Sleep Mode Timer: | 30 minutes |
| Auto-Off: | Disabled |

Software Versions

| | |
|---|---|
| Device Software: | 105.010.009.34422 |

FIG. 8B

Figure 8C:
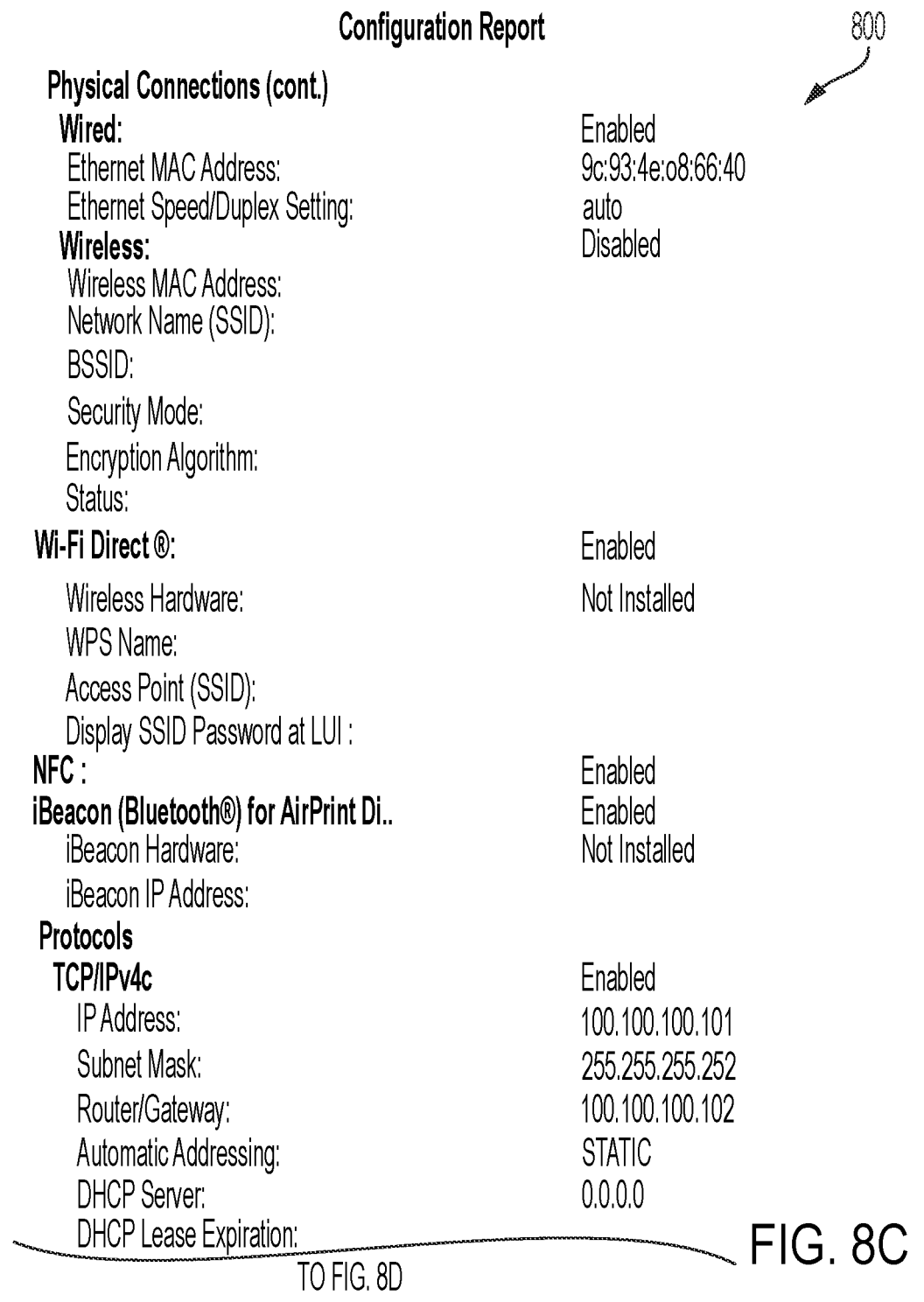

Configuration Report                                    800

Physical Connections (cont.)
  Wired:                                  Enabled
   Ethernet MAC Address:         9c:93:4e:o8:66:40
   Ethernet Speed/Duplex Setting:  auto
  Wireless:                              Disabled
   Wireless MAC Address:
   Network Name (SSID):
   BSSID:
   Security Mode:
   Encryption Algorithm:
   Status:

Wi-Fi Direct ®:                   Enabled
   Wireless Hardware:          Not Installed
   WPS Name:
   Access Point (SSID):
   Display SSID Password at LUI :

NFC :                           Enabled
iBeacon (Bluetooth®) for AirPrint Di..  Enabled
   iBeacon Hardware:          Not Installed
   iBeacon IP Address:

Protocols
   TCP/IPv4c                Enabled
    IP Address:               100.100.100.101
    Subnet Mask:            255.255.255.252
    Router/Gateway:        100.100.100.102
    Automatic Addressing:    STATIC
    DHCP Server:           0.0.0.0
    DHCP Lease Expiration:

FROM FIG. 8C

| | |
|---|---|
| BOOTP Broadcast: | Disabled |
| Self Assigned Address State: | Enabled |
| Self Assigned Address: | |
| TCP/IPv6: | Disabled |
| Link Local Address: | |
| Use Router Supplied Prefix: | Enabled |
| Stateless Global Address 1: | = |
| Stateless Global Address 2: | = |
| Manual Address: | |
| DHCP Addressing: | Use DHCP as directed by a router |
| DHCP Address: | |
| Default Gateway: | |
| DNS Settings: | |
| Requested Host Name: | XRX9C934EA86640 |
| Verified Host Name: | |
| Requested Domain Name: | XeroxC8145 |
| Verified Domain Name: | |
| Multicast DNS: | Enabled |
| Release DHCP Leases and DNS Registrati... | Disabled |
| Primary DNS Server: | 10.9.1.23 |
| Alternate DNS Server 1: | 0.0.0.0 |
| Alternate DNS Server 2: | 0.0.0.0 |
| DNS Connection Timeout: | 5 |
| Append Device Domain: | Enabled |
| Append Parent Domains: | Disabled |
| DNS Domain Search List: | XeroxC8145 |
| Prefer IPv6 DNS over IPv4: | Enabled |
| HTTP: | Enabled |
| Port Number: | 80 |

MULTI-FUNCTION DEVICE (MFD) SYSTEM CONFIGURED TO DETECT AN MFD ANOMALY

FIELD OF THE DISCLOSURE

The present disclosure is directed generally to networked multi-function devices (MFDs).

BACKGROUND

A networked multi-function device (MFD) is a single device that provides more than one function. For example, the MFD may operate as a printer, copier, fax machine, and/or scanner, among other functions. Networked MFDs typically interact locally with a variety of different devices, including client computers and other components that are connected to and communicate over a network.

In addition, the networked MFD is typically in communication with a remote server that provides support including software updates, automated ordering, and support. However, the support provided via the remote server is limited and often requires human intervention. Support issues can range from simple tasks to complex troubleshooting. In all cases, contextual information from previous ticketing history and documentation are vital, and fast access to these resources can be of fundamental importance, especially when outages and delays can have a significant impact on time and costs.

Existing technical support options are burdensome as they can require extensive form filling, ticketing systems, and tiered help desk levels. Support personnel do not always have the necessary technical knowledge or have the time to document the issue for similar cases. Thus, the support personnel must instead search through extensive legacy documentation, ticket history, and knowledge bases to find the necessary solution. These operations are time consuming and expensive. Further, information from past ticketing can be fragmented and thus difficult to utilize. Devices may send notifications and communicate requests for assistance, but the same types of technical faults may repeatedly occur, creating a frustrating customer experience.

SUMMARY OF THE DISCLOSURE

There is thus a continued need for methods and systems that offer better automated support tools for multi-function devices.

Various embodiments and implementations are directed to a multi-function device (MFD) configured to detect an MFD anomaly and provide support. The MFD includes an MED sensor(s) which is configured to obtain MFD sensor data. The MFD also includes a processor configured to: (i) receive MFD monitoring data, the MFD monitoring data comprising one or more of the MFD sensor data and user input data received from a user of the MFD; (ii) detect, from the received MFD monitoring data, an anomaly in one or more of the one or more MFDs; and (iii) identify, by a trained support model analyzing the detected anomaly, a solution to the detected anomaly. The MFD also includes a user interface configured to provide the identified solution to the user.

According to an aspect, a multi-function device (MFD) configured to detect an MFD anomaly and provide support is provided. The MFD includes: one or more MFD sensors configured to obtain MFD sensor data; a processor configured to: (i) receive MFD monitoring data, the MFD monitoring data comprising one or more of the MFD sensor data and user input data received from a user of the MFD; (ii) detect, from the received MFD monitoring data, an anomaly in one or more of the one or more MFDs; (iii) identify, by a trained support model analyzing the detected anomaly, a solution to the detected anomaly; and a user interface configured to provide the identified solution to the user.

In accordance with an embodiment, the anomaly is detected by analysis of the received MFD monitoring data by an anomaly detection model.

In accordance with an embodiment, the system or device automatically enacts the identified solution at the one or more MFDs experiencing the anomaly. In accordance with an embodiment, automatically enacting the identified solution comprises one or more of ordering a supply for an MFD, order a part for an MFD, and adjusting a setting or parameter of an MFD.

In accordance with an embodiment, providing the identified solution via the user interface of the one or more MFDs experiencing the anomaly comprises providing an instruction to a user. In accordance with an embodiment, providing the identified solution via the user interface of the one or more MFDs experiencing the anomaly comprises a visualization of the identified solution. In accordance with an embodiment, providing the identified solution comprises one or more of closing a query from a user received via the user input to the MFD, and dismissing the detected anomaly. In accordance with an embodiment, providing the identified solution further comprises escalating the detected anomaly to an expert.

In accordance with an embodiment, the user input data to the MFD comprises a query received from a user of the MFD.

In accordance with an embodiment, detecting the anomaly in one or more of the one or more MFDs comprises analyzing the query received from the user of the MED with a language model.

In accordance with an embodiment, detecting the anomaly in one or more of the one or more MFDs comprises analyzing the query received from the user of the MFD with one or more knowledge graphs identifying one or more contextual features in the query, and further wherein the trained support model identifies the solution to the detected anomaly based at least in part on the identified one or more contextual features in the query.

In accordance with an embodiment, identifying the solution to the detected anomaly further comprises classifying the detected anomaly into an anomaly category.

In accordance with an embodiment, the processor is further configured to close, after the identified solution is implemented, the detected anomaly.

In accordance with an embodiment, identifying the solution to the detected anomaly comprises generating, with a trained language model, a natural language response.

In accordance with an embodiment, the system is further configured to train the support model to analyze the detected anomaly in order to identify a solution. Training the support model includes: (i) generating support model training data, comprising the steps of: receiving a corpus of historical multimodal MFD data, the historical multimodal MFD data comprising at least MFD sensor data and historical ticketing data, wherein at least some of the corpus of historical multimodal MFD data comprises historical MFD anomalies and associated historical anomaly solutions; transforming, using a natural language process model, the received corpus of historical multimodal MFD data to support model training data of a single mode; and (ii) training a support model with the generated support model training data, wherein the support model is trained to analyze an identified MFD anomaly to identify a solution to the identified MFD anomaly.

In accordance with an embodiment, the historical multi-modal MFD data further comprises one or more of images, email text, email attachments, MFD incident logs, and audio recordings.

In accordance with an embodiment, there is a central processor in communication with the MFD. The central processor includes: a receiving module configured to receive, from one or more of the plurality of MFDs, MFD monitoring data comprising one or more of MFD sensor data and user input data to an MFD; an anomaly detection model configured to detect, from the received MFD monitoring data, an anomaly in one or more of the plurality of MFDs; the trained support model configured to identify a solution to the detected anomaly; and a transmission module configured to transmit the identified solution to the one or more of the plurality of MFDs experiencing the anomaly.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. The figures showing features and ways of implementing various embodiments and are not to be construed as being limiting to other possible embodiments falling within the scope of the attached claims. Also, the drawings are not necessarily to scale, emphasis instead generally being placed upon illustrating the principles of the various embodiments.

FIG. 5 is a flowchart of a method of providing support for one or more multi-function devices, in accordance with an embodiment.

FIG. 8A is a schematic representation of a configuration page for an MFD, in accordance with an embodiment.

FIG. 8B is a schematic representation of a configuration page for an MFD, in accordance with an embodiment.

FIG. 8C is a schematic representation of a configuration page for an MFD, in accordance with an embodiment.

FIG. 8D is a schematic representation of a configuration page for an MFD, in accordance with an embodiment.

DETAILED DESCRIPTION OF EMBODIMENTS

Various embodiments and implementations are directed to a multi-function device (MFD) configured to detect an MFD anomaly and provide support. More generally, Applicant has recognized and appreciated that it would be beneficial to provide a method and system to efficiently optimize MFD support. An MFD is provided, which includes an MFD sensor(s) configured to obtain MFD sensor data. The MFD also includes a processor configured to: (i) receive MFD monitoring data, the MFD monitoring data comprising one or more of the MFD sensor data and user input data received from a user of the MFD; (ii) detect, from the received MFD monitoring data, an anomaly in one or more of the one or more MFDs; and (iii) identify, by a trained support model analyzing the detected anomaly, a solution to the detected anomaly. The MFD also includes a user interface configured to provide the identified solution to the user.

The embodiments and implementations disclosed or otherwise envisioned herein can be utilized with any system that may utilize or benefit from automated support tools. For example, one application of the embodiments and implementations disclosed or otherwise envisioned herein is automated support tools for multi-function devices. One application is to improve monitoring and support of Xerox® multi-function devices, among other products. However, the disclosure is not limited to these devices or systems, and thus disclosure and embodiments disclosed herein can encompass any system that may utilize or benefit from automated support tools.

Figure 1:
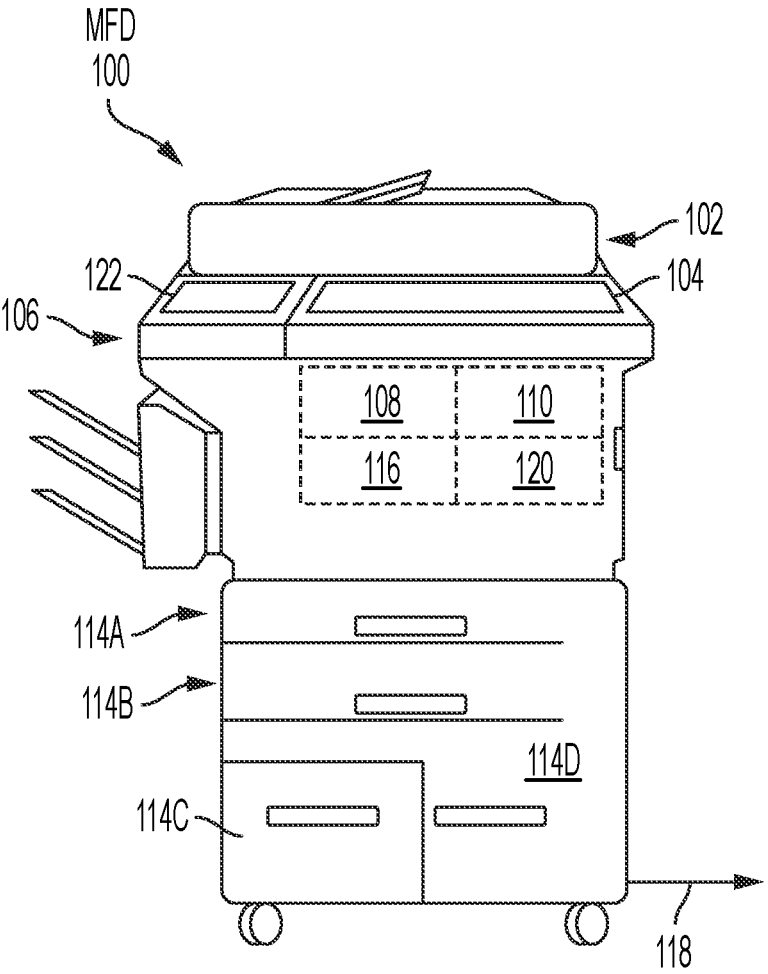
FIG. 1 is a schematic representation of an MFD, in accordance with an embodiment.

Referring to FIG. 1, in one embodiment, is a multi-function device, such as a multi-function printer (MFP). As described herein, such devices combine the capabilities of photocopiers, printers, scanners and, optionally, fax machines in one unit, acting as a hub for many of the user's document processing needs. For example, with reference to FIG. 1, an exemplary multi-function device 100 that is a multi-function printer is illustrated in accordance with certain aspects of the present disclosure. The multi-function device 100 may be a printing apparatus of the type suitable for use with the present disclosure. In embodiments, the multi-function device 100 can utilize both hardware components and software to perform one or more tasks such as printing, scanning, faxing, copying, and/or file sharing. Put another way, the multi-function device 100 can provide one or more services, such as a printing service, a scanning service, a faxing service, a copying service, a file sharing service, and/or the like. In the example of FIG. 1, the multi-function device 100 comprises a document feeder 102, a user interface 104, an image reading device 106, an image forming device 108, a duplex unit 110, an output device 122, one or more paper cassettes 114A, 114B, 114C, 114D, and a controller 116 including one or more software components for controlling the device 100. The multi-function device 100 may be connected to a network via a network connection 118. In embodiments, the multi-function device 100 may comprise one or more replaceable units 120, including but not limited to, ink or toner cartridges, a laser image forming apparatus (which may include an electric charging unit), a transfer unit, a fusing unit, one or more rollers or belts, and/or the like.

As mentioned above, the multi-function device 100 can provide one or more services, such as a printing service, a scanning service, a faxing service, a copying service, a file sharing service, and/or the like. In embodiments, the controller 116 may be configured to provide one or more of these services. For example, in some embodiments, the controller 116 may be used to implement a printing path schedule based on one or more print orders. The multi-function device 100 may be capable of simplex and/or duplex output, in which a stream of images (or digital video signals representative of images) desired to be printed causes the desired images to be formed on a selected side of a print sheet.

In further embodiments, after one or more scanning/ copying parameters may be entered via the user interface 104, the controller 116 may operate the document feeder 102 in order to convey a document to be scanned or copied to a predetermined reading position on image reading device 106. In particular embodiments, the image reading device 106 can illuminate the document conveyed to the reading position thereof, such that the resulting reflection from the document is transformed into a corresponding electric signal, or image signal, by a solid state imaging device (e.g., a Charge Coupled Device (CCD) image sensor). After the document has been read, the controller 116 may operate the multi-function device 100 to drive the document away from the reading position. In embodiments, the image forming device 108 can then form an image represented by the image signal on a printer substrate (or print media) by an electro-photographic (i.e., xerographic), thermosensitive, heat transfer, ink jet and/or similar system.

When providing a copying service, a printer substrate or print media may be fed from one or more paper cassettes 114A, 114B, 114C, 114D to the image forming device 108. In some embodiments, the duplex unit 110 may be operatively arranged to turn over the printer substrate carrying an image on one side of thereof and again feed it to the image forming device 108. As a result, an image can be formed on both sides of the printer substrate in order to complete a duplex copy.

Although certain services such as printing and copying services have been described herein, it should be appreciated that other services such as scanning, faxing, and file sharing may also be provided. For example, in the case of a scanning service, an image signal produced as described above may be digitally rendered into a file that can be transmitted (e.g., via the network connection 118) to another device, such as a remote server or directly to a user's computer. In particular embodiments, a fleet of devices 100 may be established in order to coordinate or otherwise distribute one or more services. For example, in some embodiments, a fleet of devices may include a first multi-function device that specializes in high-capacity printing jobs, a second multi-function device that specializes in scanning documents, and a plurality of multi-function devices configured to every-day printing, scanning, copying, faxing, and/or file sharing needs. These and other arrangements are possible in accordance with aspects of the present disclosure.

Figure 2:
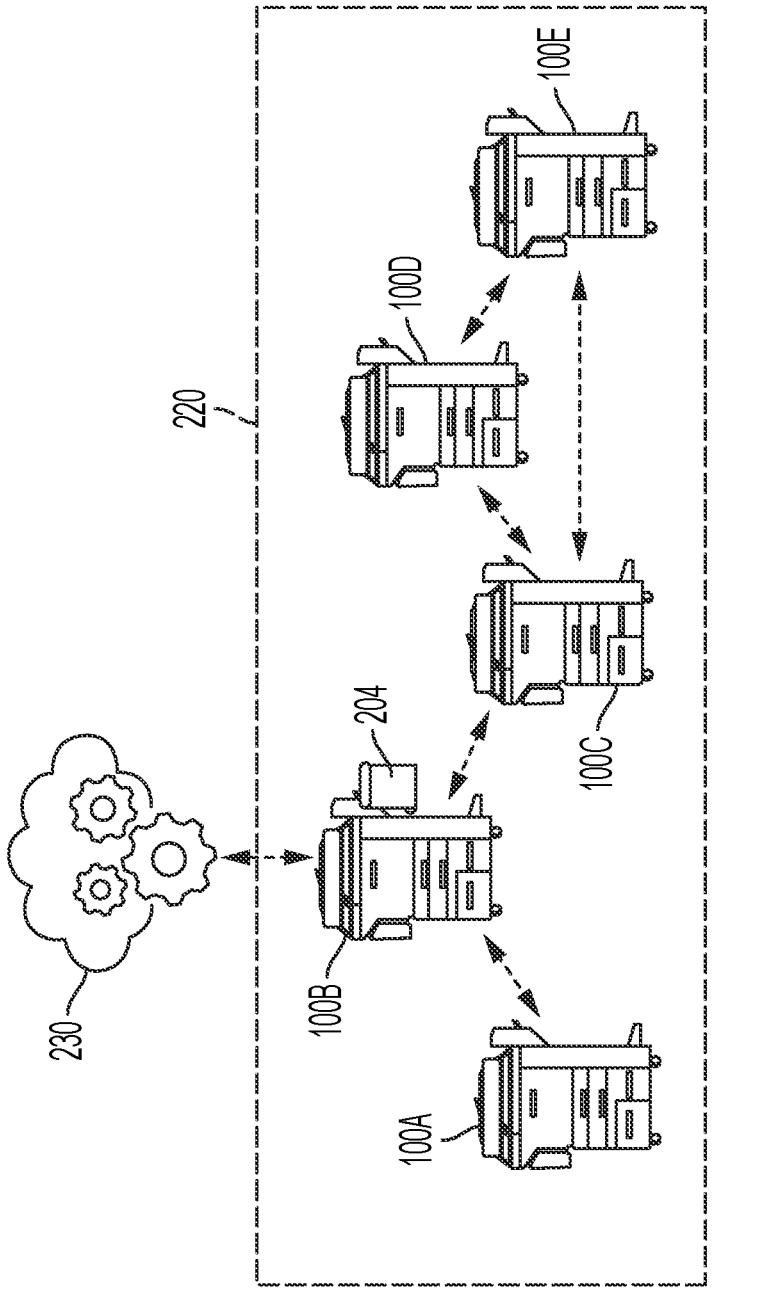
FIG. 2 is a schematic representation of a fleet of MFDs, in accordance with an embodiment.

For example, with reference to FIG. 2, a fleet 220 of MFDs 100A-100E is illustrated in accordance with certain aspects of the present disclosure. As described herein, the fleet 220 of MFDs 100A-100E may be established through the sharing of administrative credentials and/or a trust token that allows each device 100A-100E to remain securely connected with each other. In particular embodiments, the MFDs 100A-100E may be shared between a plurality of users such that a user may select one or more of the devices

100A-100E for a specific service. For example, the fleet 220 of MFDs 100A-100E may be distributed across an organization's office building, and a user (not shown) may select device 100D to complete a printing service because it is the closest device among the fleet 220. However, it should be appreciated that the fleet 220 of MFDs 100A-100E is not required to be within the same building, but may be distributed more broadly and securely connected remotely via wired and/or wireless network connections. In embodiments, each of the MFDs 100A-100E can be a multi-function printer connected via wired and/or wireless network connections in accordance with a variety of possible topologies. As shown in the example of FIG. 2, device 100A is connected with device 100B, device 100B is connected with devices 100A, 100C, device 100C is connected with devices 100B, 100D, 100E, device 100D is connected with devices 100C, 100E, and device 100E is connected with devices 100C, 100D.

With further reference to FIG. 2, the fleet 220 of MFDs 100A-100E may be connected to and/or in communication with a remote central processor 230 of a MFD monitoring and solution system. Thus, one or more of the one or more MFDs 100 in the system communicate monitoring data to the remote central processor either continuously or periodically, via any communication network. Notably, according to an embodiment, the remote central processor may be remote from the MFDs, as in a component of the system other than an MFD, but may be located on-site with the MFDs being monitored. For example, the central processor may be a "back room" processor, server, or other component performing the monitoring of the MFDs.

Figure 3:
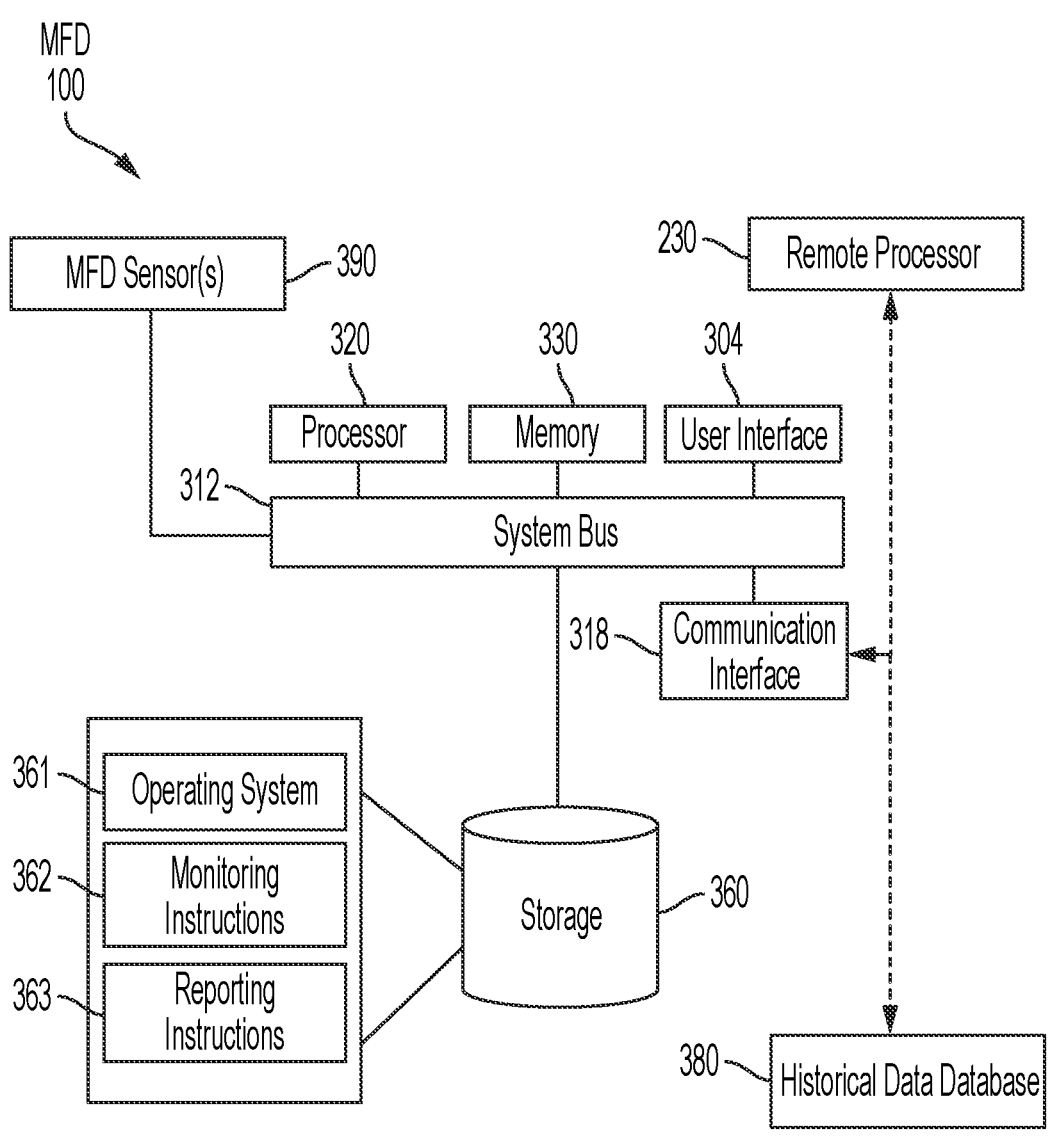
FIG. 3 is a schematic representation of an MFD, in accordance with an embodiment.

Referring to FIG. 3, in one embodiment, is a high-level schematic representation of a multi-function device 100. Referring to an embodiment of MFD 100 as depicted in FIG. 3, for example, the system comprises one or more of a processor or controller 316 including one or more software components for controlling the device 100, memory 330, user interface 304, communications interface 318, and storage 360, interconnected via one or more system buses 312. It will be understood that FIG. 3 constitutes, in some respects, an abstraction and that the actual organization of the components of the system 100 may be different and more complex than illustrated. Additionally, MFD 100 can be any of the devices or systems described or otherwise envisioned herein. Other elements and components of MFD 100 are disclosed and/or envisioned elsewhere herein.

According to an embodiment, the MFD 100 comprises one or more MFD sensors 390. The MFD sensors can be any sensors that receive or gather sensor data from one or more components or elements of the MFD. For example, an MFD sensor can be a paper feed sensor, an ink level sensor, a paper level sensor, a scanning sensor, or any other software-based or hardware-based sensor. According to an embodiment, the MFDs comprise and/or obtain MFD monitoring data, which can comprise sensor data obtained by the one or more MFD sensors 390. Sensor data obtained by the one or more MFD sensors 390 can be utilized by the MFD or an MFD monitoring and solution system immediately, or it may be stored locally and/or remotely for future use.

According to an embodiment, the MFD 100 comprises or is in communication with a historical data database 380. The historical data database 380 may comprise MFD monitoring data—comprising sensor data and/or user queries-associated with an identified anomaly in the MFD providing the monitoring data.

According to an embodiment, the MFD 100 comprises one or more user interfaces 304. The user interface 304 can be any user interface that enables user interaction with the MFD. For example, the user interface can be anything that allows information to be conveyed and/or received, and may include a display, a touchscreen, a mouse, and/or a keyboard for transmitting information and receiving user commands. In some embodiments, user interface 304 may include a command line interface or graphical user interface that may be presented to a terminal via communication interface 318. The user interface may be located with one or more other components of the MFD, or may be located remote from the MFD and in communication via a wired and/or wireless communications network. According to an embodiment, the MFDs comprise and/or obtain MFD monitoring data, which can comprise input received from the user interface 304 such as a command or query, including but not limited to a help query or any other query. MFD monitoring data received via the user interface 304 can be utilized by the MFD or an MFD monitoring and solution system immediately, or it may be stored locally and/or remotely for future use.

Figure 4:
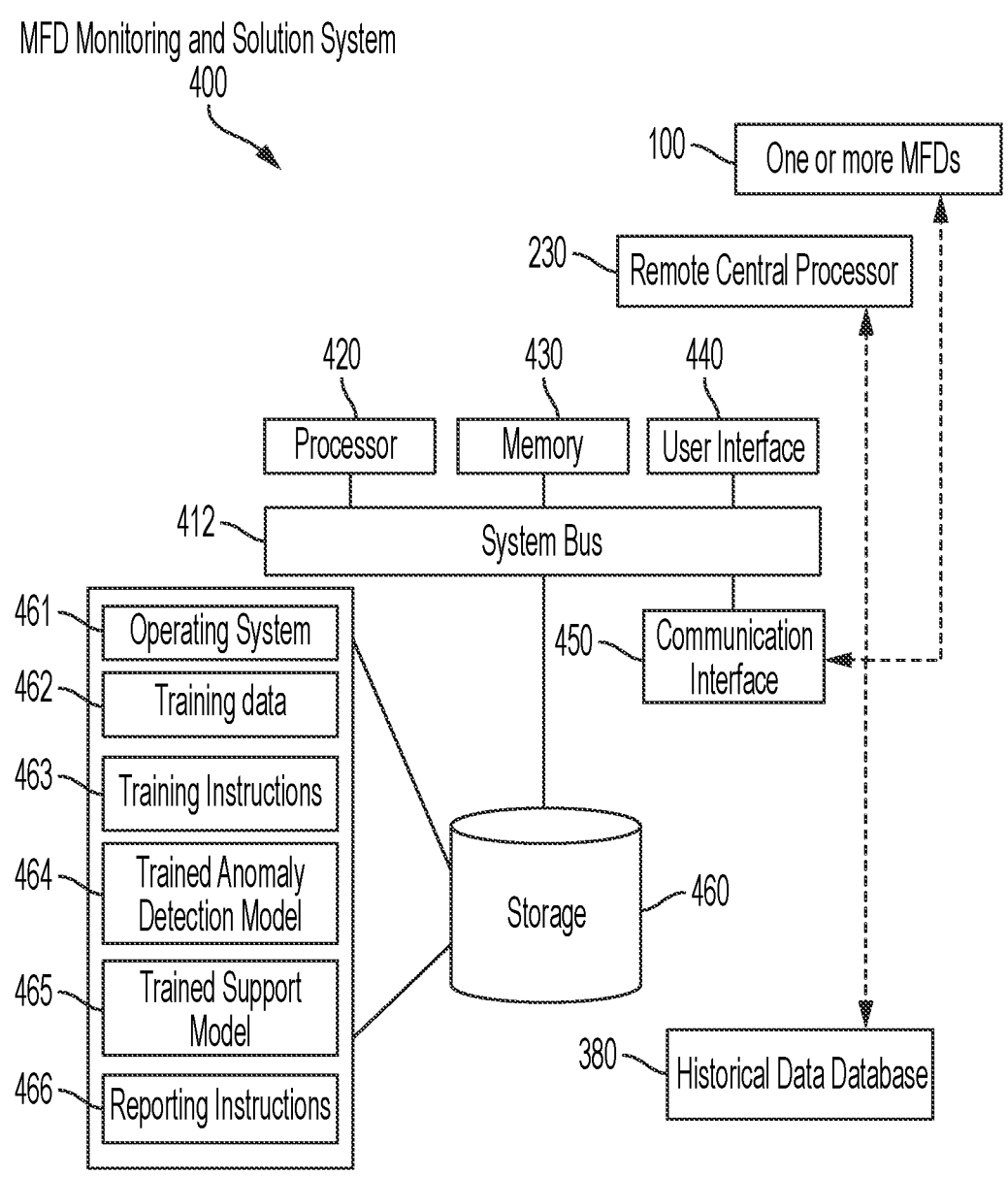
FIG. 4 is a schematic representation of an MFD monitoring and solution system, in accordance with an embodiment.

Referring to FIG. 4, in one embodiment, is an MFD monitoring and solution system 400. The MFD monitoring and solution system 400 as depicted in FIG. 4, for example, the system comprises one or more of a processor 420, memory 430, user interface 440, communications interface 450, and storage 460, interconnected via one or more system buses 412. It will be understood that FIG. 4 constitutes, in some respects, an abstraction and that the actual organization of the components of the system 400 may be different and more complex than illustrated. Additionally, MFD monitoring and solution system 400 can be any of the systems described or otherwise envisioned herein. Other elements and components of MFD monitoring and solution system 400 are disclosed and/or envisioned elsewhere herein.

According to an embodiment, MFD monitoring and solution system 400 comprises one or more local and/or remote multi-function devices (MFDs) 100. The term "multi-function device" refers to a single device or a combination of multiple devices configured to perform one or more functions such as, but not limited to, scanning, printing, copying, imaging, and the like. The multi-function device includes software, hardware, firmware, or a combination thereof. The MFD can be any device connected to the MFD monitoring and solution system 400 via a wired and/or wireless local and/or remote connection such as a local network, the internet, or any other connection. The MFD can be a home device, a business device, or any other device. The MFD can be a device that performs one or more functions, such as printing, copying, scanning, faxing, emailing, and more. MFDs, such as those offered by Xerox®, can include or comprise tablet-like touchscreen interfaces among other types of user interfaces, mobile- and cloud-readiness, copier data security, managed print services integration, customized apps, Wi-Fi connectivity, and much more. MFDs can perform many different workflows, including routing documents for electronic signature or approval, automating repetitive processes, creating custom flows that integrate with back-office systems, scanning stacks of paper into digital files that are easy to search, share and store, and printing from—or scan to—local and/or cloud-based repositories. There are many other possible MFDs, and MFD functionalities.

In accordance with one possible embodiment, the MFD monitoring and solution system 400 comprises a plurality of MFDs 100. The plurality of MFDs may be local to the other components of the MFD monitoring and solution system, may be remote to the other components of the MFD monitoring and solution system, or may be a combination of local and remote to the MFD monitoring and solution system. The plurality of MFDs may thus be located in a single local or remote location, or may be distributed among a plurality of locations.

Referring to FIG. 5, in one embodiment, is a flowchart of a method 500 for providing support for one or more multi-function devices each networked to a central processor, using an MFD monitoring and solution system. The methods described in connection with the figures are provided as examples only, and shall be understood not to limit the scope of the disclosure. The MFD monitoring and solution system can be any of the systems described or otherwise envisioned herein. The MFD monitoring and solution system can be a single system or multiple different systems.

At step 510 of the method, an MFD monitoring and solution system 400 is provided. The MFD monitoring and solution system can be system 400 as depicted in FIG. 4, although other MFD monitoring and solution systems are possible. Thus, MFD monitoring and solution system 400 can be any of the systems described or otherwise envisioned herein. Other elements and components of MFD monitoring and solution system 400 are disclosed and/or envisioned elsewhere herein.

At step 540 of method 500, the MFD monitoring and solution system 400 monitors one or more of the one or more MFDs 100 in the system. Monitoring comprises receiving MFD monitoring data by or from an MFD. The monitoring data comprises one or more of the MFD sensor data received by the one or more MFD sensors 390, and user input data received via a user interface 304. Monitoring data can be collected continuously, or it can be collected periodically such as according to a programmed or designated schedule. For example, the MFD monitoring and solution system 400 can query an MFD periodically for MFD monitoring data, or an MFD can communicate MFD monitoring data continuously or periodically. Once the MFD monitoring data is obtained or received, it may be utilized immediately or it may be stored in local and/or remote memory for future use.

According to an embodiment, monitoring of the one or more MFDs is performed by a remote central processor 230 of the MFD monitoring and solution system 400. Thus, one or more of the one or more MFDs 100 in the system communicate MFD monitoring data to the remote central processor either continuously or periodically, via any communication network. Once the MFD monitoring data is obtained or received by the remote central processor 230, it may be utilized immediately or it may be stored in local and/or remote memory for future use. Notably, according to another possible embodiment, the remote central processor may be remote from the MFDs, as in a component of the system other than an MFD, but may be located on-site with the MFDs being monitored. For example, the central processor may be a "back room" processor, server, or other component performing the monitoring of the MFDs.

According to an embodiment, monitoring of the one or more MFDs is performed by an MFD, either the same MFD or a different MFD. For example, an MFD may monitor the MFD monitoring data generated by that MFD according to the method described or otherwise envisioned herein, rather than communicating—or in addition to communicating—the MFD monitoring data to a remote central processor 230. As another example, in a system with a plurality of MFDs, one of the MFDs may be a central monitoring device that receives or otherwise obtains MFD monitoring data from the plurality of MFDs in the system. Once the MFD monitoring data is obtained or received by the monitoring MFD, it may be utilized immediately or it may be stored in local and/or remote memory for future use.

At step 550 of the method, the MFD monitoring and solution system 400 detects an anomaly in one or more of the MFDs being monitored. According to an embodiment, the anomaly is detected by analysis of the received MFD monitoring data by the system. The system may use any method for identifying an anomaly from the MFD monitoring data. According to an embodiment, the MFD monitoring data received by the system and utilized to identify an anomaly comprises sensor data that is utilized by the system to identify the anomaly. The MFD monitoring data received by the system and utilized to identify an anomaly may alternatively or further comprise a user query or other user input that is utilized by the system to identify the anomaly.

An "anomaly" may be any of a wide variety of states, conditions, parameters, variations, or other status of an MFD and/or the MFD monitoring and solution system. For example, a category of "performance anomalies" may include one or more of: low toner/marking material of a particular color, as detected for example by print count or sensor; low paper of a given type/in a given drawer, as detected for example by print count or sensor; sheet jams or similar mechanical failures at a given location within the MFD, as detected for example by a sensor; unusual or out-of-range current or voltage draws as detected for example by a given sensor; lack of image-related signals going into a laser or printhead within an MFD; scheduled expiration of a customer-replaceable part such as a fuser module or paper feeder module; a situation relating to the production and subsequent detection of any test images within an MFD; a situation relating to the transfer of image data of any kind into, out of, or within a particular MFD, or between MFD's in a network, among many other types of anomalies. It will be understood that these examples are a non-limiting non-exhaustive list of possible anomalies. Other non-limiting and non-exhaustive examples of anomalies are provided and envisioned herein.

Once detected, the anomaly may be utilized or analyzed immediately, or it may be stored in local or remote storage for future use. For example, at step 530 of the method, the system receives a user query or support ticket from a user at an MFD or other component of the system.

According to an embodiment, the anomaly is detected by analysis of the received MFD monitoring data using an anomaly detection model of the MFD monitoring and solution system 400. The anomaly detection model may be a component of the remote central processor 230, or it may be a component of a monitoring MFD 100, or of any other component of the system. For example, the remote central processor 230 may comprise a trained anomaly detection model, one or more of the MFDs 100 may comprise a trained anomaly detection model, or any other component of the system may comprise a trained anomaly detection model.

The anomaly detection model 464 (referring to FIG. 4) is trained to analyze received MFD monitoring data (as input to the model) to determine, identify, or predict an anomaly in the MFD (as output of the model). The trained anomaly detection model can be any model that can be trained to utilize the input to generate the output, as described or otherwise envisioned herein. For example, the trained anomaly detection model can be a neural network or other trained machine learning model. Thus, according to an embodiment, the MFD monitoring and solution system 400 comprises a trained anomaly detection model 464 that receives the input data and outputs a determined, identified, or predicted anomaly in one or more monitored MFDs. The trained anomaly detection model is unique based on the training data used to train the model. Once generated, the trained anomaly detection model 464 can be utilized immediately, or it may be stored in local and/or remote memory for future use.

According to an embodiment, the trained anomaly detection model 464 is or comprises a language model, the language model configured to detect the anomaly in an MFD by analyzing the query received from the user of the MFD. Thus, for example, the MFD monitoring data comprises a query provided to the MED by a user via a user interface, and the language model analyzes the query to identify, determine, or predict an anomaly in the MFD. According to an embodiment, detecting an anomaly comprises analyzing the query received from the user of the MFD with one or more knowledge graphs identifying one or more contextual features in the query, as described or otherwise envisioned herein.

Figure 6:
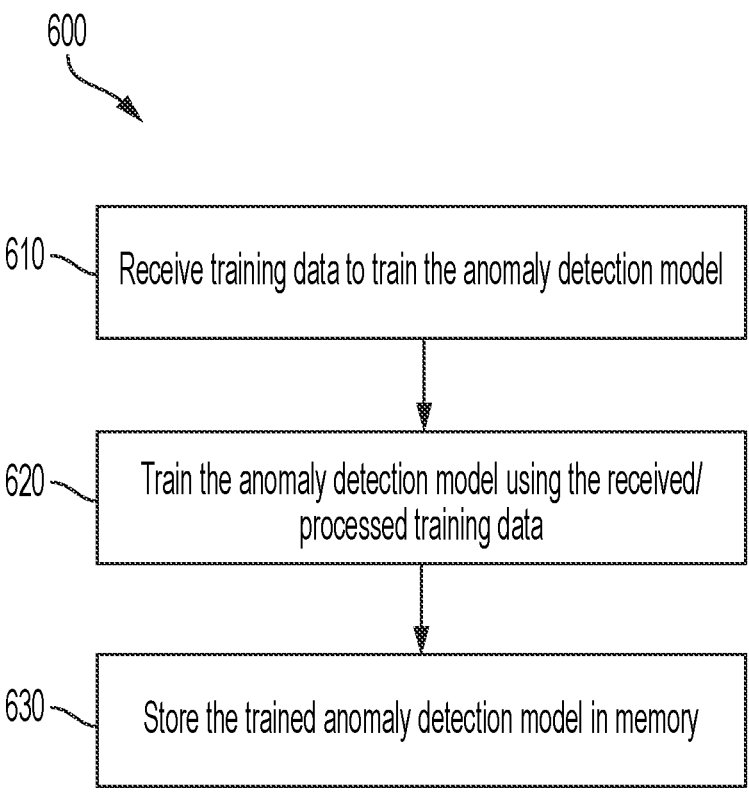
FIG. 6 is a flowchart of a method for training an MFD monitoring and solution system, in accordance with an embodiment.

The anomaly detection model 464 can be trained in a variety of ways. Referring to FIG. 6, in one embodiment, is a flowchart of a method 600 for training the anomaly detection model 464. The method may be performed by the MFD monitoring and solution system 400, or may be performed by another system such as a specialized machine learning model training system.

At step 610 of the method, the training system receives training data which will be used to train the model. The training data can be any data sufficient to train the model to utilize the described input data to generate the described output. For example, the training data may comprise MFD monitoring data—comprising sensor data and/or user queries—that is associated with an identified anomaly in the MFD providing the monitoring data, optionally including ground truth optimization or other supervision (although the model can be trained in an unsupervised manner as well). This training data, which could be utilized in a supervised or unsupervised manner, can comprise MFD monitoring data and identified anomalies for 100 s or 1000 s of MFDs, MFD monitoring data, anomalies, and so on. The training data may also comprise other information. This training data may be obtained and curated by an expert such as a technician or support specialist, or it may be obtained and curated under the supervision of a technician or support specialist, or it may be obtained and utilized without curation. The training data may be received from any source. For example, the training data may be received from a historical data database 280 of the MFD monitoring and solution system 400. The historical data database 280 may comprise the MFD monitoring data-comprising sensor data and/or user queries-associated with an identified anomaly in the MFD providing the monitoring data. According to an embodiment, the MFD monitoring and solution system 400 comprises or is in direct or indirect communication with a database which comprises some or all of the training data set.

According to an embodiment, the training system may comprise a data pre-processor or similar component or algorithm configured to process the received training data. For example, the data pre-processor analyzes the training data to remove noise, bias, errors, and other potential issues. The data pre-processor may also analyze the input data to remove low quality data. Many other forms of data pre-processing or data point identification and/or extraction are possible.

At step 620 of the method, the training system trains the anomaly detection model 464 to determine, identify, or predict an anomaly from input data, using the training data. The anomaly detection model is trained using any method for training such a model. The trained anomaly detection model is a unique model based on the training data used to train the model. Following training, the system comprises a trained anomaly detection model. Thus, following training, the anomaly detection model is a specialized model configured to receive the specialized input (such as features extracted from MFD monitoring data) and generate the very specific output, namely the determined, identified, or predicted anomaly in the MFD.

At step 630 of the method, the trained anomaly detection model is stored for future use. According to an embodiment, the trained anomaly detection model may be stored in local or remote storage.

Returning to method 500 in FIG. 5, at step 552 of the method, the MFD monitoring and solution system 400 classifies the detected anomaly into an anomaly category, as described or otherwise envisioned herein. For example, the support model of the MFD monitoring and solution system 400 can be trained to classify an anomaly into an anomaly category, thus constituting an anomaly categorization and/or classification along with anomaly detection and identification. Notably, step 552 may be combined with step 550 and/or step 560 of the method, or may occur before or after these steps.

For example, in accordance with one non-limiting embodiment, the system can utilize categorical data to tag the context of an error or issue. Thus, anomalies can be classified in one or more of numeric ranges and in one or more categories. For example, categories can be binary (1 normal-0 anomaly) or multiple (Cat 1='Americas,' Cat 2='EMEA,' Cat 3='India,' Cat 4=NA>>Anomaly). One of the most common methods for detecting or classifying anomalies is to utilize grading, such as a score (1 to 10, for example) with a threshold of acceptable boundaries. Outside the threshold or boundaries are detected outliers (e.g., an "anomaly"). For example, a configuration page for an MFD may comprise both numeric and categorical data which can be utilized to detect and categorize anomalies. Many other methods for detecting or classifying anomalies are possible.

At step 560 of the method, the MFD monitoring and solution system 400 utilizes the determined, identified, or predicted anomaly in the MFD—generated by the trained anomaly detection model 464—to determine, identify, or predict a solution to the anomaly. According to an embodiment, the solution is detected by analysis of the determined, identified, or predicted anomaly in the MFD, by the system. The system may use any method for identifying, determining, or predicting a solution from the anomaly. Once determined, identified, or predicted, the solution may be communicated and/or implemented immediately, or it may be stored in local or remote storage for future use.

According to an embodiment, the solution is detected by analysis of the determined, identified, or predicted anomaly using a trained support model 465 of the MFD monitoring and solution system 400. The trained support model may be a component of the remote central processor 230, or it may be a component of a monitoring MFD 100, or of any other component of the system. For example, the remote central processor 230 may comprise a trained support model, one or more of the MFDs 100 may comprise a trained support model, or any other component of the system may comprise a trained support model.

The support model 465 (referring to FIG. 4) is trained to analyze a determined, identified, or predicted anomaly (as input to the model) to determine, identify, or predict a solution to the anomaly (as output of the model). The trained support model can be any model that can be trained to utilize the input to generate the output, as described or otherwise envisioned herein. For example, the trained support model can be a neural network or other trained machine learning model. Thus, according to an embodiment, the MFD monitoring and solution system 400 comprises a trained support model 465 that receives the input data and outputs a determined, identified, or predicted anomaly solution. The trained support model is unique based on the training data used to train the model. Once generated, the trained support model 465 can be utilized immediately, or it may be stored in local and/or remote memory for future use.

According to an embodiment, the trained support model is configured to analyze the determined, identified, or predicted anomaly by classifying the detected anomaly into an anomaly category, as described or otherwise envisioned herein. According to an embodiment, the trained support model is configured to analyze the determined, identified, or predicted anomaly by generating, with a trained language model, a natural language response, as described or otherwise envisioned herein.

Figure 7:
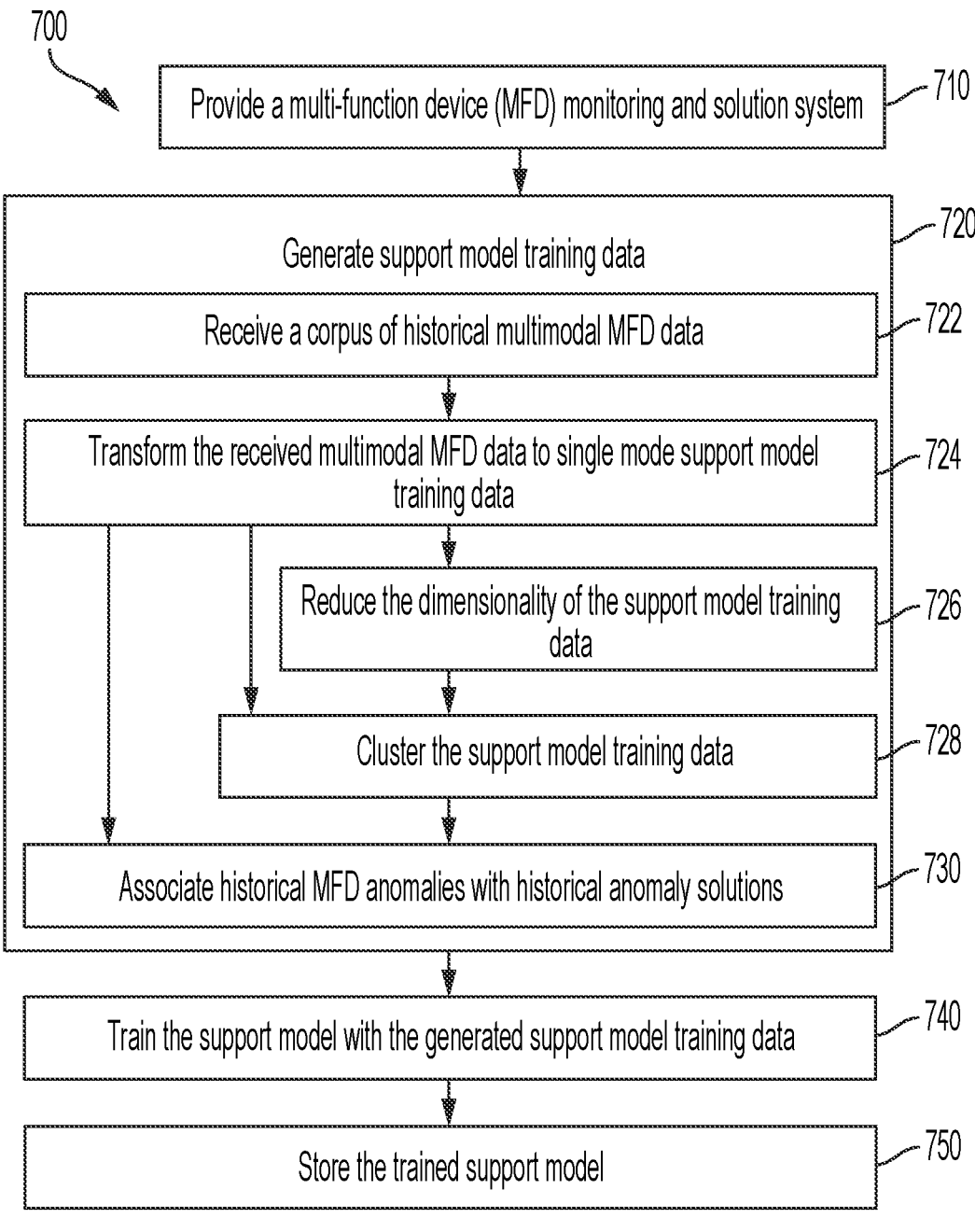
FIG. 7 is a flowchart of a method for training an MFD monitoring and solution system, in accordance with an embodiment.

The support model 465 can be trained in a variety of ways. Referring to FIG. 5, at step 520 of the method the support model is trained to analyze a determined, identified, or predicted anomaly (as input to the model) to determine, identify, or predict a solution to the anomaly (as output of the model). Referring to FIG. 7, in one embodiment, is a flowchart of a method 700 for training the support model 465.

At step 710 of the method, a multi-function device monitoring and solution system 400 is provided. However, the method may be performed by the MFD monitoring and solution system 400, or it may be performed by another device such as an MFD or by another system such as a specialized machine learning model training system.

At step 720 of the method, support model training data is generated. The support model training data can be generated in a variety of mechanisms, including as described or otherwise envisioned herein. Once generated, the support model training data can be utilized immediately to train the support model, or it can be saved in local and/or remote memory for future use. The support model training data can be supplemented, altered, or otherwise modified over time, such as with updated training data.

According to an embodiment, at step 722 of method 700, the system receives a corpus of historical multimodal MFD data. According to an embodiment, the historical multimodal MFD data comprises at least MFD sensor data and historical ticketing data. At least some of the corpus of historical multimodal MFD data comprises historical MFD anomalies and associated historical anomaly solutions. Thus, the training data will comprise both historical anomalies, including an identification and/or other information about the anomalies, and solutions associated with those anomalies.

The historical multimodal MFD data can be received from a wide variety of difference sources. According to an embodiment, in addition to MFD sensor data and historical ticketing data, the historical multimodal MFD data comprises one or more of images, email text, email attachments, MFD incident logs, and audio recordings. Once received, the historical multimodal MFD data can be utilized immediately to train the support model, or it can be saved in local and/or remote memory for future use.

At step 724 of the method, the received corpus of historical multimodal MFD data is transformed to support model training data of a single mode. Thus, although the received MFD data will be multimodal as described or otherwise envisioned herein, the output of step 724 of the method will be MFD data of a single mode which can be utilized in downstream steps of the method. According to an embodiment, the received corpus of historical multimodal MFD data is transformed to support model training data of a single mode using a natural language process model, although other methods of transforming the data are possible.

The natural language process model is trained to analyze received historical multimodal MFD data comprising multiple different modes (as input to the model) to generate MFD data of a single mode (as output of the model). The trained natural language process model can be any model that can be trained to utilize the input to generate the output, as described or otherwise envisioned herein. For example, the trained natural language process model can be a neural network or other trained machine learning model. Thus, according to an embodiment, the MFD monitoring and solution system 400 comprises a trained natural language process model that receives the input data and outputs MFD data of a single mode. The trained natural language process model is unique based on the training data used to train the model. Once generated, the trained natural language process model can be utilized immediately, or it may be stored in local and/or remote memory for future use.

According to an embodiment, at step 726 of the method, the system reduces the dimensionality of the single mode support model training data. This can be accomplished using many methods for reducing the dimensionality of data. According to one embodiment, reducing the dimensionality of the single mode support model training data comprises removal of personal data identifiers in the support model training data. Many other options for reducing the dimensionality of the single mode support model training data are possible.

According to an embodiment, at step 728 of the method, the support model training data is clustered. This can be accomplished using any method for clustering, including a clustering algorithm among other methods. Many other options for clustering the single mode support model training data are possible.

At step 730 of the method, the single mode support model training data, which is optionally clustered at step 728, is further analyzed or processed by associating historical MFD anomalies with historical anomaly solutions. This can be accomplished using any method for associating data within memory.

According to an embodiment, the training system may comprise a data pre-processor or similar component or algorithm configured to process the received training data. For example, the data pre-processor analyzes the training data to remove noise, bias, errors, and other potential issues. The data pre-processor may also analyze the input data to remove low quality data. Many other forms of data pre-processing or data point identification and/or extraction are possible.

At step 740 of the method, the support model is trained using the generated training data. The support model is a neural network or other trained machine learning model trained to analyze a determined, identified, or predicted anomaly (as input to the model) to determine, identify, or predict a solution to the anomaly (as output of the model). The trained support model can be any model that can be trained to utilize the input to generate the output, as described or otherwise envisioned herein. The support model is trained using any method for training such a model. Following training, the system comprises a trained support model. Thus, following training, the support model is a specialized model configured to receive the specialized input and generate the very specific output, namely the determined, identified, or predicted anomaly solution.

At step 750 of the method, the trained support model is stored for future use. According to an embodiment, the trained support model may be stored in local or remote storage.

EXAMPLE

The following is non-limiting examples of methods for training a support model 465 to identify solutions to an identified anomaly. It will be understood that the following is only provided as examples of the described methods, and thus that these examples do not limit the scope of the disclosure.

In accordance with an embodiment, as described or otherwise envisioned herein, the multi-function device monitoring and solution system 400 is configured for anomaly detection coupled with a contextual artificial intelligence, such as a trained support model, to provide solutions for detected anomalies. According to an embodiment, the data utilized to train the anomaly detection model and/or the trained support model is tagged data that may already exist within a system and can thus be utilized for training.

For example, a service manager system, such as the Xerox Service Manager, may comprise tagged data utilized to monitor and troubleshoot MFD issues. The tagged data of the service manager system may thus be utilized to train the anomaly detection model and/or the trained support model. For example, the system may comprise information such as account number for the MFD or fleet of MFDs, model number of the MFD, asset location (such as geography), MFD sensor data, user input, an incident summary, troubleshooting solution(s), and more.

One of the aspects of utilizing this tagged data to train the anomaly detection model and/or the trained support model is to minimize false positives in error messages. The system can utilize categorical data to tag the context of an error or issue, and thus can reduce the frequency of false positives.

Thus, anomalies can be classified in one or more of numeric ranges and in categories. For example, categories can be binary (1 normal-0 anomaly) or multiple (Cat 1='Americas,' Cat 2='EMEA,' Cat 3='India,' Cat 4=NA>>Anomaly). One of the most common methods for detecting or classifying anomalies is to utilize grading, such as a score (1 to 10, for example) with a threshold of acceptable boundaries. Outside the threshold or boundaries are detected outliers (e.g., an "anomaly").

Referring to non-exhaustive and non-limiting examples of contextual data that can be obtained, mined, and/or otherwise utilized as described or otherwise envisioned herein, are the following. For example, the system can process the following as categories and/or as numeric: (i) configuration report (categories); (ii) image quality parameter (numeric range); (iii) meter counters (numeric range); (iv) jam (alerts, machine logs); (v) maintenance/consumables (numeric ranges, levels); (vi) user access/security (access rules, logs); and (vii) others.

According to an embodiment, these can be nodes, and the recommendations fixes cans be linked to each of them. For example, the "image quality" issue can be linked to the correct settings of printhead lenses in a specific model. Or "lines when copying" can be linked to "copy calibration parameters."

According to an embodiment, the system effectively monitors one or more of these data points on a continuous and/or periodic basis. For example, the system can monitor one or more of these data points day to day, streaming data into the expected nodes and ranges. If the incoming data falls outside specific numeric ranges, parameters, or expected categories, then anomalies are detected, decision algorithms are triggered, providing the automated trouble-shooting and support, diagnostics, and fix, or supplies orders, and so on, as described or otherwise envisioned herein.

Example Classification Threshold Method

In a binary classification, a number between 0 and 1 that converts the raw output of a logistic regression model into a prediction of either the positive class or the negative class. The classification threshold can be a value that a human chooses, or a value chosen by model training, among other methods.

According to an embodiment, a logistic regression model outputs a raw value between 0 and 1. Then: (i) if this raw value is greater than the classification threshold, then the positive class is predicted; or (ii) if this raw value is less than the classification threshold, then the negative class is predicted. For example, suppose the classification threshold is 0.8. If the raw value is 0.9, then the model predicts the positive class. If the raw value is 0.7, then the model predicts the negative class. The choice of classification threshold strongly influences the number of false positives and false negatives.

For the numeric aspect one can utilize variables such as Accuracy, Precision, and Recall. How this works is based on calculating a rate of Precision; when training various ML models, the system will progressively choose the most accurate ones. Accuracy is a metric that measures how often a machine learning model correctly predicts the outcome. one can calculate accuracy by dividing the number of correct predictions by the total number of predictions. Accuracy is ponderated by the other variables, precision and recall.

$$\text{Accuracy} = \frac{\text{Correct predictions}}{\text{All predictions}} \qquad \text{(Eq. 1)}$$

From the labels or classifications, the system trains the machine learning algorithms, and then analyzes statistics of outputs, tries various models, and compares which ones have more false positives, or false negatives. The system can then calculate accuracy, and select a well-performing model to trigger the alerts, automations, and so on.

Thus, via the above metrics the system can train a machine learning models via decision forest algorithms, among other methods. According to an embodiment, for detection using categorical data, one can use classification machine learning models.

According to an embodiment, a classification model pre-dicts a class. For example, the following are all classification models: (i) a model that predicts an input sentence's lan-guage (e.g., French? Spanish? Italian?); (ii) a model that predicts a class of ticket (e.g., supply? Or break-fix?); and (iii) a model that predicts the positive or negative class (e.g., managed device or unmanaged device?). In contrast, regres-sion models predict numbers rather than classes. Thus, two common types of classification models are binary classifi-cation and multi-class classification.

Generally, a different subset of features is sampled for each node. In contrast, when training a decision tree without attribute sampling, all possible features are considered for each node.

According to an embodiment, a classifier model utilizes AUC (Area under the ROC curve). In accordance, a number between 0.0 and 1.0 represents a binary classification mod-el's ability to separate positive classes from negative classes. The closer the AUC is to 1.0, the better the model's ability to separate classes from each other. AUC ignores any value one sets for classification threshold. Instead, AUC considers all possible classification thresholds. According to an embodiment, AUC is the probability that a classifier will be more confident that a randomly chosen positive example is actually positive than that a randomly chosen negative example is positive.

Reducing False Positive Alerts with Contextual Anomaly Detection and Decision Trees Traditionally, monitoring alerts are produced comparing metrics against thresholds to identify behavior outside the norm. This approach of metrics-based alert definitions often generates too many false positives that lead to wasted human time and effort or worse yet, loss of confidence and ignoring alerts as general practice.

Efforts to improve alert quality typically lead to devising more granular alerts. This approach leads to improved alerting for specific conditions, but introduces significant complexity in alert definitions and their associated mainte-nance as dimensionality increases.

What is needed are high-confidence alerts that identify truly anomalous events as they occur in real-time, from a system that learns and adapts to data immediately.

Using Categorical Data

Machine categorical data is composed of the strings of information included in data logs and events: such as file names, IP addresses, HTTP status codes, geographical infor-mation, etc. Including categorical data in the monitoring analysis provides a greatly expanded context from which to evaluate application and network performance logs. As much as 80% of the information in logs and events is categorical data, and thus it is logical to include it in monitoring. Doing so lets the system reduce the false positives that often overwhelm the people monitoring these systems, and also lets the system explain why an alert was generated.

Additional context gained by incorporating categorical dimensions of data provides a significant benefit in rapidly identifying unique data, identified as having high "surprise" value in the system, as well as recognizing anomalous data as separate from unique values. So that it can tell us when "new" is actually just "normal." High cardinality is a nor-mally expected condition of many data types. User agents, IP addresses, and file names, are all examples of data that can have many values.

Alerts with Fewer False Positives

Utilizing the additional context provided by including categorical data in anomaly detection can significantly improve the quality of alerting. When there is high confi-dence in the ability to identify the real signal-from-the-noise, users save the time they historically spent chasing false positives, and they get back time to build more automation into the support processes.

For finding anomalies in real-time in data sets that include categorical data, the system can identify an API that scores submitted observations for their novelty, thus enabling real-time anomaly detention with fewer false positives than traditional threshold based metric analysis.

Notably, the configuration page for an MFD contains both numeric and categorical data, which can be utilized to detect the anomalies. For example, referring to FIGS. 8A-8D, in one embodiment, is a non-limiting example of a configuration page 800 for an MFD, specifically a Xerox AltaLink. Although this configuration page 800 is shown as an example, it will be understood that a configuration page can comprise many other types and kinds of information.

TABLE 1

Examples of kinds of data that can be represented
both as numeric data and categorical data.

| Numeric | Categorical |
| --- | --- |
| Rate: 27 events/second | Model: AltaLink C8145 |
| Score: 0.91237 | IP Address: 00.100.100.101 |
| Clicks (counts): 2,743 | File path: C:\Windows\System32\notepad.exe |

Categorical data is often directly interpretable by humans, but often more of a challenge to interpret with computers. While numeric data is produced by measuring, and one can usually divide them (at least conceptually) into smaller parts as much as one wants, categorical data is counted or referenced, not measured. It is often something one can point at or refer to linguistically. Each data point in a plot has a numeric position, but even if two points have the same position the data points themselves are distinct. While the numerical data is processed by common analysis tools, often the categorical data is ignored in the hope that numeric data happens to contain the answers that will be needed in the future.

However, in accordance with an embodiment, there is much that can be done with categorical data. For example, log data comprises a wealth of information about categorical values, According to one embodiment, categorical data is counted. If one does not ignore categorical data, then by far the most common thing to do with it is to count the values. Entire tech stacks—and even entire companies—have been built around counting how many times each categorical value is seen. It is often very useful to know how frequent some values are. Rare values can be insightful. Common values can help one understand data better. The word-count problem has become the de facto 'hello, world' style example when getting started with stream processing tools.

According to one embodiment, categorical data is therefore turned into numbers, If one tries to do something more sophisticated than simple counting, then the next most common approach is to use one of a handful of techniques to try to represent the categorical data as numeric data. Another approach is to 'embed' the categorical data into a high-dimensional vector space. This process will put similar values close to each other, and dissimilar values farther away. Embedding techniques can accomplish highly informative results in some specialized context, this depends on large amounts of data, expertly trained, in a batch process ahead of time, and cannot be used on data previously unseen.

With categorical values represented as nodes in a graph, a wealth of information can be represented or discovered by analyzing the structure of that graph. Knowledge Graphs can concisely represent the domain expertise of large groups, and can lead to new discoveries simply by connecting what we already know. A connected graph represents the ideal data representation for flexible/schema-less data structures which can also be computed on easily.
Graph Data and Knowledge Bases The development of graph databases over the last few years has been a major step forward in making use of categorical data. The graph model works well even with small categorical datasets, powerful graph data model can also be supported for high-volume stream processing tools. For example, Power BI Fabric® or Apache® Kafka® are powerful tools for delivering event streams, and other similar tools can be used to join those event streams together and process them through a streaming graph engine to produce a more intelligent real-time stream as output.

In accordance with an embodiment, therefore, categorical data is the key to improving anomaly detection in challenging domains to produce real-time novelty scores, assessments, and explanations through behavioral fingerprinting. These systems have been shown to accurately assess the novelty of categorical data in cybersecurity event streams and reduce false positives by 99%.

In accordance with an embodiment, sensor data can comprise streaming data with a great deal of categorical data which has previously been a long-neglected and underused class of data. Notably, however, this data is already being collected by virtually all enterprise companies.
Sensor Data is Connected Categorical Data The hidden value of categorical data lies in its potential relationship to other values. Embedding techniques can approximate these relationships, but a more natural approach is to represent the relationships directly. It is proposed to use emerging graph technologies to do exactly that. A graph is built of nodes and edges. One can picture this with circles for nodes and arrows for edges. The Node-Edge-Node pattern connects two categorical values (as nodes) by a relationship represented by the edge. This is a very natural way to represent data because that Node-Edge-Node pattern corresponds perfectly to the Subject-Predicate-Object pattern at the core of natural language.

With categorical values represented as nodes in a graph, a wealth of information can be represented or discovered by analyzing the structure of that graph. Knowledge Graphs can concisely represent the domain expertise of large groups, and can lead to new discoveries simply by connecting what we already know. A connected graph represents the ideal data representation for flexible/schema-less data structures which can also be computed on easily.
Bias Toward Numeric Analysis Analysis tools primarily concentrate on numeric data, emphasizing the challenges associated with quantifying relationships among categorical values. While categorical relationships can be valuable, their inherent difficulty in quantification makes it challenging to distinctly prove the superiority of one analysis over another. Graph Theory, a potent mathematical discipline addressing this issue, is typically reserved for graduate-level instruction and is accessible to only a limited number of practitioners. Consequently, many data analysts and scientists confine their work to quantitative tools studied in statistics, leading to a scarcity of tools within the industry for handling categorical data.
High Cardinality Cardinality denotes the potential number of values a specific category might encompass. For instance, the U.S.A. has fifty states, illustrating low cardinality. High cardinality, conversely, involves an unwieldy multitude of diverse values, such as all possible street addresses in the U.S.A. Managing high cardinality proves challenging for certain aforementioned strategies, like counting, as it necessitates maintaining an extensive array of counters. When exploring relationships among multiple values with high cardinality, the approach typically involves managing distinct counters for every conceivable value combination. Dealing with high cardinality data presents a sizeable and rapidly escalating challenge due to its size and complexity.

An associated hurdle when working with high-cardinality categorical data arises when the complete set of possible values is unknown beforehand—an issue referred to as increasing cardinality. Most tools for converting categorical values into numerical representations, such as one-hot encoding and embedding techniques, demand a predetermined set of possible values. These tools are incapable of representing data they have not encountered before.

In accordance with an embodiment, the system can be configured to effectively leverage the abundance of categorical data by actively incorporating this data into the analytical process. Considering over half of the data amassed by enterprise companies remains unused, despite being collected, stored, and incurring costs, when a substantial portion of this neglected data is categorical and may contain crucial information for resolving otherwise complex issues. The inclination to disregard categorical data in favor of numeric data, driven by the limitations of current tools designed for numbers, results in leaving numerous problems unresolved.

Networked devices streaming data tools are making categorical data more accessible and usable. This long-neglected and underused class of data is already being collected by virtually all enterprise companies, and the methods and systems disclosed or otherwise envisioned herein utilize this data to solve challenging machine support problems.

Returning to method 500 in FIG. 5, at step 570 of the method, the MFD monitoring and solution system 400 transmits the determined, identified, or predicted solution to the one or more MFDs that are experiencing the anomaly. For example, if the anomaly identification and/or the solution determination are performed by a remote central processor 230, the identified solution (with or without the identified anomaly) may be communicated to the MFD that provided the MFD monitoring data and is experiencing the anomaly. According to an embodiment, an anomaly may be detected in one MFD but could be experienced or likely to be experienced by other MFDs, and thus the solution is communicated to one or more MFDs in addition to the MFD that provided the MFD monitoring data. For example, the system may transmit the determined, identified, or predicted solution to all MFDs in the system.

According to another embodiment, the anomaly identification and/or the solution determination are performed by an MFD of the system. For example, in a system with a plurality of MFDs, one of the MFDs may be a central monitoring device that receives or otherwise obtains MFD monitoring data from the plurality of MFDs in the system, identifies an anomaly, and identifies a solution. Alternatively, one of the MFDs may be a central communicating MFD and will receive a solution that is transmitted to other MFDs in the system.

The determined, identified, or predicted solution may be communicated to an MFD from the remote central processor 230, the monitoring MFD 100, or any other component of the system using any method for communication, including wired and/or wireless communication networks. Once received, the determined, identified, or predicted solution may be utilized or implemented immediately, or it may be saved in local and/or remote memory for future use.

At step 580 of the method, the determined, identified, or predicted solution may be provided or otherwise communicated via a user interface of the one or more MFDs that receive the solution and/or are experiencing the anomaly. Communication via the user interface can be any type of communication, including displaying the solution on a screen or monitor, sending the solution via text, email, or other transfer, or any other method of communication. According to just one example, the determined, identified, or predicted solution may be provided or otherwise communicated via a user interface to a user. This may comprise, for example, an instruction to the user on how to implement the solution. This may comprise, for example, a visualization of the identified solution. According to an embodiment, providing the identified solution may further comprise escalating the detected anomaly to an expert.

At step 590 of the method, the determined, identified, or predicted solution may be automatically enacted by the receiving MFD. For example, the solution may be an action that the MFD can take, automatically and without human intervention, to resolve the identified anomaly. According to various embodiments, automatically enacting the identified solution can include one or more of ordering a supply for an MFD, order a part for an MFD, and adjusting a setting or parameter of an MFD.

At step 592 of the method, the detected anomaly can be closed by the MFD, the remote central processor, or any other component of the system. Closing the detected anomaly can be any action that dismisses or otherwise resolves or ends analysis of the anomaly or solution. Closing the detected anomaly can be, for example, closing a query from a user received via the user input to the MFD. According to an embodiment, closing the detected anomaly also includes documenting or archiving the detected anomaly and identified solution for future use or analysis, including but not limited to training or updating a model of the system.

Referring again to FIG. 4 is a schematic representation of an MFD monitoring and solution system 400. System 400 may be any of the systems described or otherwise envisioned herein, and may comprise any of the components described or otherwise envisioned herein. It will be understood that FIG. 4 constitutes, in some respects, an abstraction and that the actual organization of the components of the system 400 may be different and more complex than illustrated.

According to an embodiment, system 400 comprises a processor 420 capable of executing instructions stored in memory 430 or storage 460 or otherwise processing data to, for example, perform one or more steps of the method. Processor 420 may be formed of one or multiple modules. Processor 420 may take any suitable form, including but not limited to a central processing unit (CPU), graphical processing unit (GPU), tensor processing unit (TPU), neural processing unit (NPU), microprocessor, microcontroller, multiple microcontrollers, circuitry, field programmable gate array (FPGA), application-specific integrated circuit (ASIC), a single processor, or plural processors.

Memory 430 can take any suitable form, including a non-volatile memory and/or RAM. The memory 430 may include various memories such as, for example L1, L2, or L3 cache or system memory. As such, the memory 430 may include static random access memory (SRAM), dynamic RAM (DRAM), flash memory, read only memory (ROM), or other similar memory devices. The memory can store, among other things, an operating system. The RAM is used by the processor for the temporary storage of data. According to an embodiment, an operating system may contain code which, when executed by the processor, controls operation of one or more components of system 400. It will be apparent that, in embodiments where the processor implements one or more of the functions described herein in hardware, the software described as corresponding to such functionality in other embodiments may be omitted.

User interface 440 may include one or more devices for enabling communication with a user. The user interface can be any device or system that allows information to be conveyed and/or received, and may include a display, a mouse, and/or a keyboard for receiving user commands. In some embodiments, user interface 440 may include a command line interface or graphical user interface that may be presented to a remote terminal via communication interface 450. The user interface may be located with one or more other components of the system, or may be located remote from the system and in communication via a wired and/or wireless communications network.

Communication interface 450 may include one or more devices for enabling communication with other hardware devices. For example, communication interface 450 may include a network interface card (NIC) configured to communicate according to the Ethernet protocol. Additionally, communication interface 450 may implement a TCP/IP stack for communication according to the TCP/IP protocols. Various alternative or additional hardware or configurations for communication interface 450 will be apparent.

Storage 460 may include one or more machine-readable storage media such as read-only memory (ROM), random-access memory (RAM), magnetic disk storage media, optical storage media, hard disk drive (HDD), solid state drive (SSD), flash-memory devices, or similar storage media. In various embodiments, storage 460 may store instructions for execution by processor 420 or data upon which processor 420 may operate. For example, storage 460 may store an operating system 461 for controlling various operations of system 400.

It will be apparent that various information described as stored in storage 460 may be additionally or alternatively stored in memory 430. In this respect, memory 430 may also be considered to constitute a storage device and storage 460 may be considered a memory. Various other arrangements will be apparent. Further, memory 430 and storage 460 may both be considered to be non-transitory machine-readable media. As used herein, the term non-transitory will be understood to exclude transitory signals but to include all forms of storage, including both volatile and non-volatile memories.

While system 400 is shown as including one of each described component, the various components may be duplicated in various embodiments. For example, processor 420 may include multiple microprocessors that are configured to independently execute the methods described herein or are configured to perform steps or subroutines of the methods described herein such that the multiple processors cooperate to achieve the functionality described herein. Further, where one or more components of system 400 is implemented in a cloud computing system, the various hardware components may belong to separate physical systems. For example, processor 420 may include a first processor in a first server and a second processor in a second server. Many other variations and configurations are possible.

According to an embodiment, MFD monitoring and solution system 400 comprises or is in direct or indirect communication with one or more MFDs 100. The one or more MFDs may be local to the other components of the MFD monitoring and solution system, may be remote to the other components of the MFD monitoring and solution system, or may be a combination of local and remote to the MFD monitoring and solution system. The plurality of MFDs may thus be located in a single local or remote location, or may be distributed among a plurality of locations.

According to an embodiment, the MFD monitoring and solution system 400 comprises or is in direct or indirect communication with a historical data database 380. The historical data database 480 may comprise the MFD monitoring data—comprising sensor data and/or user queries—associated with an identified anomaly in the MFD providing the monitoring data. According to an embodiment, the historical data database 380 comprises training data—or information that will be utilized as training data—to train the anomaly detection model 464 and/or the support model 465. According to an embodiment, the historical data database 380 may be a local or remote database and is in direct and/or indirect communication with system 400. Thus, according to an embodiment, the system comprises a historical data database 380.

According to an embodiment, storage 460 of system 400 may store one or more algorithms, modules, and/or instructions to carry out one or more functions or steps of the methods described or otherwise envisioned herein. For example, storage 460 may comprise, among other instructions or data, training data 462, training instructions 463, trained anomaly detection model 464, trained support model 465, and/or reporting instructions 466.

According to an embodiment, the MFD monitoring and solution system 400 comprises training data 462, which may be utilized to train one or more of the anomaly detection model 464 and the support model 465. The training data can be any data sufficient to train the model to utilize the described input data to generate the described output. For example, when utilized to train the anomaly detection model 464, the training data may comprise MFD monitoring data—comprising sensor data and/or user queries—that is associated with an identified anomaly in the MFD providing the monitoring data, optionally including ground truth optimization or other supervision (although the model can be trained in an unsupervised manner as well). This training data, which could be utilized in a supervised or unsupervised manner, can comprise MFD monitoring data and identified anomalies for 100 s or 1000 s of MFDs, MFD monitoring data, anomalies, and so on. The training data may also comprise other information. This training data may be obtained and curated by an expert such as a technician or support specialist, or it may be obtained and curated under the supervision of a technician or support specialist, or it may be obtained and utilized without curation. The training data may be received from historical data database 380 of the MFD monitoring and solution system 400.

According to an embodiment, when utilized to train the support model 465, the training data may comprise historical anomaly and solution data as described or otherwise envisioned herein. This training data, which could be utilized in a supervised or unsupervised manner, can comprise historical anomaly and solution data and other data for 100 s or 1000 s of anomalies and solutions. The training data may also comprise other information. This training data may be obtained and curated by an expert such as a technician or support specialist, or it may be obtained and curated under the supervision of a technician or support specialist, or it may be obtained and utilized without curation. The training data may be received from historical data database 380 of the MFD monitoring and solution system 400.

According to an embodiment, training instructions 463 direct the system to utilize training data 462 to train one or more of the anomaly detection model 464 and the support model 465, as described or otherwise envisioned herein. The training instructions can direct the system to train the models in a supervised or unsupervised manner. Many methods for training the models are possible, as described or otherwise envisioned herein.

According to an embodiment, trained anomaly detection model 464 is a neural network or other trained machine learning model trained to analyze received MFD monitoring data (as input to the model) to determine, identify, or predict an anomaly in the MFD (as output of the model). The trained anomaly detection model can be any model that can be trained to utilize the input to generate the output, as described or otherwise envisioned herein. Thus, according to an embodiment, the MFD monitoring and solution system 400 comprises a trained anomaly detection model 464 that receives the input data and outputs a determined, identified, or predicted anomaly in one or more monitored MFDs. The trained anomaly detection model is unique based on the training data used to train the model.

According to an embodiment, trained support model 465 is a neural network or other trained machine learning model trained to analyze a determined, identified, or predicted anomaly (as input to the model) to determine, identify, or predict a solution to the anomaly (as output of the model). The trained support model can be any model that can be trained to utilize the input to generate the output, as described or otherwise envisioned herein. Thus, according to an embodiment, the MFD monitoring and solution system 400 comprises a trained support model 465 that receives the input data and outputs a determined, identified, or predicted anomaly solution. The trained support model is unique based on the training data used to train the model.

According to an embodiment, reporting instructions 466 direct the system to provide the output of the system—such as the determined, identified, or predicted anomaly and the determined, identified, or predicted solution—to one or more MFDs and/or to a user of the system or a user of an MFD. The provided output can be any of the information as described or otherwise envisioned herein. The system may provide the information to a user via any mechanism, including but not limited to a visual display, an audible notification, a page, or any other method of notification. The information may be communicated by wired and/or wireless communication to another device. For example, the system may communicate the information to a monitor, screen, mobile phone, computer, laptop, wearable device, and/or any other device configured to allow display and/or other communication of the information.

Referring to FIG. 3 is a schematic representation of an MFD 100 of the MFD monitoring and solution system 400. The MFD can be any of the devices described or otherwise envisioned herein, and may comprise any of the components described or otherwise envisioned herein. It will be understood that FIG. 3 constitutes, in some respects, an abstraction and that the actual organization of the components of MFD 100 may be different and more complex than illustrated.

According to an embodiment, MFD 100 comprises a processor 320 capable of executing instructions stored in memory 330 or storage 360 or otherwise processing data to, for example, perform one or more steps of the method. Processor 320 may be formed of one or multiple modules. Processor 320 may take any suitable form, including but not limited to a central processing unit (CPU), graphical processing unit (GPU), tensor processing unit (TPU), neural processing unit (NPU), microprocessor, microcontroller, multiple microcontrollers, circuitry, field programmable gate array (FPGA), application-specific integrated circuit (ASIC), a single processor, or plural processors.

Memory 330 can take any suitable form, including a non-volatile memory and/or RAM. The memory 330 may include various memories such as, for example L1, L2, or L3 cache or system memory. As such, the memory 330 may include static random access memory (SRAM), dynamic RAM (DRAM), flash memory, read only memory (ROM), or other similar memory devices. The memory can store, among other things, an operating system. The RAM is used by the processor for the temporary storage of data. According to an embodiment, an operating system may contain code which, when executed by the processor, controls operation of one or more components of MFD 100. It will be apparent that, in embodiments where the processor implements one or more of the functions described herein in hardware, the software described as corresponding to such functionality in other embodiments may be omitted.

User interface 340 may include one or more devices for enabling communication with a user. The user interface can be any device or system that allows information to be conveyed and/or received, and may include a display, a mouse, and/or a keyboard for receiving user commands. In some embodiments, user interface 340 may include a command line interface or graphical user interface that may be presented to a remote terminal via communication interface 350. The user interface may be located with one or more other components of the system, or may be located remote from the MFD 100 and in communication via a wired and/or wireless communications network.

Communication interface 350 may include one or more devices for enabling communication with other hardware devices. For example, communication interface 350 may include a network interface card (NIC) configured to communicate according to the Ethernet protocol. Additionally, communication interface 350 may implement a TCP/IP stack for communication according to the TCP/IP protocols. Various alternative or additional hardware or configurations for communication interface 350 will be apparent.

Storage 360 may include one or more machine-readable storage media such as read-only memory (ROM), random-access memory (RAM), magnetic disk storage media, optical storage media, hard disk drive (HDD), solid state drive (SSD), flash-memory devices, or similar storage media. In various embodiments, storage 360 may store instructions for execution by processor 320 or data upon which processor 320 may operate. For example, storage 360 may store an operating system 361 for controlling various operations of MFD 100.

It will be apparent that various information described as stored in storage 360 may be additionally or alternatively stored in memory 330. In this respect, memory 330 may also be considered to constitute a storage device and storage 360 may be considered a memory. Various other arrangements will be apparent. Further, memory 330 and storage 360 may both be considered to be non-transitory machine-readable media. As used herein, the term non-transitory will be understood to exclude transitory signals but to include all forms of storage, including both volatile and non-volatile memories.

While MFD 100 is shown as including one of each described component, the various components may be duplicated in various embodiments. For example, processor 320 may include multiple microprocessors that are configured to independently execute the methods described herein or are configured to perform steps or subroutines of the methods described herein such that the multiple processors cooperate to achieve the functionality described herein. Further, where one or more components of MFD 100 is implemented in a cloud computing system, the various hardware components may belong to separate physical systems. For example, processor 320 may include a first processor in a first server and a second processor in a second server. Many other variations and configurations are possible.

Although not shown in FIG. 3, the MFD may be a monitoring MFD such that it comprises one or more of the trained anomaly detection model 464 and/or the trained support model 465. Additionally, although not shown in FIG. 3, the MFD comprises software and/or hardware components necessary to enact the functionality of the MFD. In embodiments, the MFD comprises paper tray(s), paper feeder(s), printer(s), scanner(s), fax component(s), email component(s), and/or other components.

According to an embodiment, MFD 100 is in direct or indirect communication with a remote central processor 230. The MFD may transmit MFD monitoring data to the remote central processor 230 according to the methods described or otherwise envisioned herein.

According to an embodiment, MFD 100 is in direct or indirect communication with a historical data database 380. The historical data database 380 may comprise the MFD monitoring data—comprising sensor data and/or user queries—associated with an identified anomaly in the MFD providing the monitoring data. According to an embodiment, the historical data database 380 comprises training data—or information that will be utilized as training data—to train the anomaly detection model 464 and/or the support model 465. According to an embodiment, the historical data database 380 may be a local or remote database and is in direct and/or indirect communication with MFD 100.

According to an embodiment, MFD 100 comprises one or more MFD sensors 390. The MFD sensors can be any sensors that receive or gather sensor data from one or more components or elements of the MFD. For example, an MFD sensor can be a paper feed sensor, an ink level sensor, a paper level sensor, a scanning sensor, or any other software-based or hardware-based sensor. According to an embodiment, the MFDs comprise and/or obtain MFD monitoring data, which can comprise sensor data obtained by the one or more MFD sensors 390. Sensor data obtained by the one or more MFD sensors 390 can be utilized by the MFD or the MFD monitoring and solution system 400 immediately, or it may be stored locally and/or remotely for future use.

According to an embodiment, storage 360 of MFD 100 may store one or more algorithms, modules, and/or instructions to carry out one or more functions or steps of the methods described or otherwise envisioned herein. For example, storage 360 may comprise, among other instructions or data, monitoring instructions 362 and/or reporting instructions 363.

According to an embodiment, monitoring instructions 362 direct the MFD to monitor the MFD using MFD monitoring data. The MFD monitoring data comprises, for example, one or more of the MFD sensor data received by the one or more MFD sensors 390, and user input data received via a user interface 340. Thus, monitoring instructions 362 can direct the MFD to handle queries received via the user interface. Monitoring data can be collected continuously, or it can be collected periodically such as according to a programmed or designated schedule. For example, the MFD or another component of the system can query an MFD periodically for MFD monitoring data, or an MFD can communicate MFD monitoring data continuously or periodically. Once the MFD monitoring data is obtained or received, it may be utilized immediately or it may be stored in local and/or remote memory for future use.

According to an embodiment, reporting instructions 363 direct the system to provide the output of the system—such as the determined, identified, or predicted anomaly and the determined, identified, or predicted solution—via a user interface 340 of the MFD. The provided output can be any of the information as described or otherwise envisioned herein. The system may provide the information to a user via any mechanism, including but not limited to a visual display, an audible notification, a page, or any other method of notification. The information may be communicated by wired and/or wireless communication to another device. For example, the system may communicate the information to a monitor, screen, mobile phone, computer, laptop, wearable device, and/or any other device configured to allow display and/or other communication of the information.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A multi-function device (MFD) configured to detect an MFD anomaly and provide support, comprising:
   one or more MFD sensors configured to obtain MFD sensor data;
   a processor configured to: (i) receive MFD monitoring data, the MFD monitoring data comprising one or more of the MFD sensor data and user input data received from a user of the MFD; (ii) detect, from the received MFD monitoring data, an anomaly in one or more MFDs; (iii) identify, by a trained support model analyzing the detected anomaly, a solution to the detected anomaly; and
   a user interface configured to provide the identified solution to the user.

2. The MFD of claim 1, wherein the anomaly is detected by analysis of the received MFD monitoring data by an anomaly detection model.

3. The MFD of claim 1, further comprising automatically enacting the identified solution at the one or more MFDs experiencing the anomaly.

4. The MFD of claim 3, wherein automatically enacting the identified solution comprises one or more of ordering a supply for an MFD, order a part for an MFD, and adjusting a setting or parameter of an MFD.

5. The MFD of claim 1, wherein providing the identified solution via the user interface of the one or more MFDs experiencing the anomaly comprises providing an instruction to a user.

6. The MFD of claim 1, wherein providing the identified solution via the user interface of the one or more MFDs experiencing the anomaly comprises a visualization of the identified solution.

7. The MFD of claim 1, wherein providing the identified solution comprises one or more of closing a query from a user received via the user interface of the MFD, and dismissing the detected anomaly.

8. The MFD of claim 1, wherein providing the identified solution further comprises escalating the detected anomaly to an expert.

9. The MFD of claim 1, wherein the user input data to the MFD comprises a query received from a user of the MFD.

10. The MFD of claim 9, wherein detecting the anomaly in the one or more MFDs comprises analyzing the query received from the user of the MFD with a language model.

11. The MFD of claim 9, wherein detecting the anomaly in the one or more MFDs comprises analyzing the query received from the user of the MFD with one or more knowledge graphs identifying one or more contextual features in the query, and further wherein the trained support model identifies the solution to the detected anomaly based at least in part on the identified one or more contextual features in the query.

12. The MFD of claim 1, wherein identifying the solution to the detected anomaly further comprises classifying the detected anomaly into an anomaly category.

13. The MFD of claim 1, where the processor is further configured to close, after the identified solution is implemented, the detected anomaly.

14. The MFD of claim 1, wherein identifying the solution to the detected anomaly comprises generating, with a trained language model, a natural language response.

15. The MFD of claim 1, further comprising training the support model to analyze the detected anomaly in order to identify a solution, comprising:
   generating support model training data, comprising the steps of:
      receiving a corpus of historical multimodal MFD data, the historical
   multimodal MFD data comprising at least MFD sensor data and historical ticketing data, wherein at least some of the corpus of historical multimodal MFD data comprises historical MFD anomalies and associated historical anomaly solutions;
      transforming, using a natural language process model, the received corpus of historical multimodal MFD data to support model training data of a single mode; and
   training a support model with the generated support model training data, wherein the support model is trained to analyze an identified MFD anomaly to identify a solution to the identified MFD anomaly.

16. The MFD of claim 15, wherein the historical multimodal MFD data further comprises one or more of images, email text, email attachments, MFD incident logs, and audio recordings.

17. A central processor in communication with the MFD of claim 1, the central processor comprising:
   a receiving module configured to receive, from the one or more MFDs, MFD monitoring data comprising one or more of MFD sensor data and user input data to an MFD;
   an anomaly detection model configured to detect, from the received MFD monitoring data, an anomaly in the one or more MFDs;
   the trained support model configured to identify a solution to the detected anomaly; and
   a transmission module configured to transmit the identified solution to the one or more MFDs experiencing the anomaly.

18. The central processor of claim 17, wherein the trained support model is trained by a method comprising:

generating support model training data, comprising the steps of:

receiving a corpus of historical multimodal MFD data, the historical multimodal MFD data comprising at least MFD sensor data and historical ticketing data, wherein at least some of the corpus of historical multimodal MFD data comprises historical MFD anomalies and associated historical anomaly solutions;

transforming, using a natural language process model, the received corpus of historical multimodal MFD data to support model training data of a single mode; and training a support model with the generated support model training data, wherein the support model is trained to analyze an identified MFD anomaly to identify a solution to the identified MFD anomaly.

19. The central processor of claim 18, wherein the historical multimodal MFD data further comprises one or more of images, email text, email attachments, MFD incident logs, and audio recordings.

\* \* \* \* \*